(12) United States Patent
Sekiguchi

(10) Patent No.: US 6,429,840 B1
(45) Date of Patent: Aug. 6, 2002

(54) METHOD OF DRIVING COLOR LIQUID CRYSTAL DISPLAY PANEL AND METHOD OF CONTROLLING DISPLAY OF TIMEPIECE

(75) Inventor: Kanetaka Sekiguchi, Sayama (JP)

(73) Assignee: Citizen Watch Co., Ltd., Tokyo (JP)

( * ) Notice: Subject to any disclaimer, the term of this patent is extended or adjusted under 35 U.S.C. 154(b) by 0 days.

(21) Appl. No.: 09/831,904

(22) PCT Filed: Sep. 27, 2000

(86) PCT No.: PCT/JP00/06675
§ 371 (c)(1),
(2), (4) Date: May 25, 2001

(87) PCT Pub. No.: WO01/24156
PCT Pub. Date: May 4, 2001

(30) Foreign Application Priority Data

Sep. 27, 1999 (JP) ............................................ 11-272613

(51) Int. Cl.$^7$ ................................................. G09G 3/36
(52) U.S. Cl. ........................... 345/88; 345/87; 349/106; 349/108
(58) Field of Search ............................ 345/50, 87, 90, 345/92, 93, 95, 96, 100, 204, 205, 206, 211, 214, 88, 22, 83; 349/42, 151, 153, 106, 107, 108

(56) References Cited

FOREIGN PATENT DOCUMENTS

| JP | 2-82294 | 3/1990 |
|---|---|---|
| JP | 3-188893 | 1/1991 |
| JP | 3-189691 | 8/1991 |
| JP | 5-143019 | 6/1993 |
| JP | 10-206195 | 8/1998 |
| JP | 11-175035 | 7/1999 |

*Primary Examiner*—Bipin Shalwala
*Assistant Examiner*—Mansour M. Said
(74) *Attorney, Agent, or Firm*—Armstrong, Westerman & Hattori, LLP

(57) ABSTRACT

In a color liquid crystal display panel in which a liquid crystal layer is sealed in a gap between a first substrate formed with signal electrodes and a second substrate formed with data electrodes, portions where the signal electrodes cross over the data electrodes form pixel portions respectively, and color filters, in which filters of the three primary colors are alternately arranged at positions corresponding to the pixel portions, is provided, a normal color display of applying selection signals to all the signal electrodes in a time sharing manner and applying data signals to the data electrodes in correspondence with the selection signals applied to the respective signal electrodes; and a color reducing display of applying selection signals in such a manner to simultaneously select a plurality of the signal electrodes; are selectively performed, thereby reducing the power consumption of the color liquid crystal display panel.

34 Claims, 18 Drawing Sheets

METHOD OF DRIVING COLOR LIQUID CRYSTAL DISPLAY PANEL AND METHOD OF CONTROLLING DISPLAY OF TIMEPIECE

TECHNICAL FIELD

The present invention relates to a method of driving a liquid crystal display panel which includes color filters and performs a color display, wherein the number of display colors is reduced and limited, and further, a driving signal is stopped to reduce the power consumption of the liquid crystal display panel, thereby enabling low power consumption. Further, the present invention relates to a method of controlling a display of a timepiece to which reduction in power consumption is strongly required, wherein a liquid crystal display panel thereof is driven by the above-described driving method.

BACKGROUND TECHNOLOGY

As a method of driving a liquid crystal display panel including: signal electrodes provided on a first substrate; opposed electrodes provided on a second substrate; color filters provided on the first substrate or on the second substrate; and a liquid crystal layer sealed between the first substrate and the second substrate, and performing a color display by electro-optical change in the liquid crystal layer at pixel portions constituted of intersections of the signal electrodes and the opposed electrodes, a color display pattern signal of applying selection signals in a time sharing manner to all the signal electrodes which constitute the pixel portions of the liquid crystal display panel and applying data signals to the opposed electrodes in correspondence to the selection signals of the respective signal electrodes to thereby perform a display, is currently used in a small-sized information device.

One color display pattern signal uses a display pattern signal of applying gradation signals at many levels, and another uses a display pattern signal of applying gradation signals at several levels, and, further, a color display can be performed using a binary color display pattern signal using only ON/OFF. Even a case where gradation signals are not applied at levels but are applied at no levels are applied can also be regarded as gradation at many levels. That is because the no level gradation can be regarded as smooth gradation having a large number of gradation levels.

It should be noted that a full color display generally represents a display to which the gradation signals having no levels are applied as described above, but a display to which the gradation signals at many levels are applied is also called the full color display in this Description.

Further, d liquid crystal display panel of a liquid crystal display device having no color filter disposed has been developed, which has a display pattern signal of applying the gradation signals at many levels or the gradation signals at several levels, or of using only ON/OFF.

By the way, it is important for the liquid crystal display panel to have excellent display quality. In addition, as TVs shifted from a black-and-white display to a color display, the color display can provide variety in presentation of information.

On the other hand, as the display is shifted from a monochrome binary display to the gradation display at many levels, and further to the full color display, the frequency of a signal required for the display increases and an effective voltage applied to the liquid crystal layer decreases, bringing about a disadvantage that a voltage to be applied to each electrode needs to be increased.

Concerning the above, there is a method of applying signals to the signal electrodes after executing arithmetic processing to the signals for several rows of signal electrodes in order to reduce the voltages to be applied to the respective electrodes, but the arithmetic processing and a memory are necessary for the display, requiring further improvement to reduce power consumption.

Further, as a method of solving a decrease in display contrast due to a frame response phenomenon which occurs when using a high response super twisted nematic (STN) liquid crystal, a mode is suggested in SID92 Digest "Active Addressing Method for High-Contrast Video-Rate STN Display." It is necessary to simultaneously apply voltages corresponding to orthogonal functions to row electrodes (signal electrodes) and to apply voltages corresponding to results of product-sum operations between display information of the respective columns and the functions provided to the respective row electrodes, to column electrodes (data electrodes), presenting disadvantages of occurrence of the arithmetic processing and the switching of signals to the data electrodes corresponding to the number of the row electrodes to which voltages are simultaneously applied, and occurrence of consumption of electric power due to charging and discharging currents of the liquid crystal.

Moreover, a cellular phone or the like employs a partial display of performing a display limited to a display such as an icon or the like during a reception stand-by state, which causes a disadvantage that the quantity of displayable information decreases.

Therefore, an object of the present invention is to reduce electric power consumed by a liquid crystal display device, which includes color filters and is capable of providing much information in a color display to a user thereof, to increase battery life with its display quality maintained as high as possible.

In particular, another object of the present invention is to enable realization of both the color display and low power consumption in the liquid crystal display device to enable a color display in a timepiece which has a strict limitation in volume and battery capacity.

DISCLOSURE OF THE INVENTION

To achieve the above-described objects, in the present invention, when in a color liquid crystal display panel including: a transparent first substrate formed with a plurality of signal electrodes and a transparent second substrate formed with a plurality of data electrodes arranged so that a face formed with the signal electrodes and a face formed with the data electrodes are opposed to each other; a liquid crystal layer sealed in a gap therebetween; pixel portions respectively constituted at portions where the signal electrodes cross over and planarly overlap the data electrodes; and color filters, in which filters of three primary colors are alternately arranged at least at positions corresponding to the pixel portions, provided on the first substrate or on the second substrate, a display is performed by selectively applying a voltage between the signal electrode and the opposed electrode to thereby change optical characteristics of the liquid crystal layer between the signal electrode and the opposed electrode at the pixel portion, the display is performed as follows.

A normal color display of applying selection signals to the plurality of signal electrodes constituting all the pixel portions of the color liquid crystal display panel in a time sharing manner, and applying data signals to the data electrodes in correspondence to the selection signals of the signal electrodes to allow the color filters of the pixel portions to be individually selected; and a color reducing display of applying selection signals in such a manner to simultaneously select a plurality of the signal electrodes to simultaneously select the filters of a plurality of the colors arranged at positions corresponding to the plurality of signal electrodes; are selectively performed.

Alternatively, a normal color display of applying selection signals to the plurality of signal electrodes constituting all the pixel portions of the color liquid crystal display panel in a time sharing manner, and applying data signals to the data electrodes in correspondence to the selection signals of the signal electrodes to allow the color filters of the pixel portions to be individually selected; and a limited color display of applying selection signals to part of the plurality of signal electrodes in a time sharing manner, and not applying selection signals to other signal electrodes to allow only the color filters arranged at positions corresponding to the signal electrodes to which the selection signals are applied to be selected; are selectively performed.

In this event, it is suitable that the driven color liquid crystal display panel is a color liquid crystal display panel including color filters, in which filters of three primary colors in the form of stripes are alternately arranged to be parallel to and planarly overlap the signal electrodes, provided on the first substrate or on the second substrate, and selection signals are applied to simultaneously select a plurality of the signal electrodes in the color reducing display to simultaneously select the filters of a plurality of the colors in the form of stripes arranged to planarly overlap the plurality of signal electrodes respectively.

Alternatively, it is suitable that selection signals are applied to part of the plurality of signal electrodes in a time sharing manner, and no selection signal is applied to other signal electrodes in the limited color display to allow only the filters, out of the color filters, in the form of stripes arranged to planarly overlap the signal electrodes respectively to which the selection signals are applied to be selected.

Further, in the present invention, when a display is performed on the liquid crystal display panel, a full color display of applying selection signals to the plurality of signal electrodes constituting all the pixel portions of the liquid crystal display panel in a time sharing manner, and applying data signals to the data electrodes in correspondence to the selection signals of the signal electrodes, and, further, at least one of the selection signal and data signal serving as a gradation signal for changing at many levels optical characteristics of the liquid crystal layer to allow the filters of three primary colors to be individually selected including gradations required for the full color display; and a reduced color display of reducing the number of levels of the gradation signal to be less than that of the full color display to allow the filters of three primary colors to be individually selected with the reduced gradation; are selectively performed.

In this event, it is suitable that a color reducing display of applying selection signals in such a manner to simultaneously select a plurality of the signal electrodes to simultaneously select the filters of a plurality of the colors arranged at positions corresponding to the plurality of signal electrodes, or a limited color display of applying selection signals to a part of the plurality of signal electrodes in a time sharing manner, and not applying selection signals to other signal electrodes to allow only the color filters arranged at positions corresponding to the signal electrodes to which the selection signals are applied to be selected, is also allowed to be selected.

Further, in the present invention, when in a color liquid crystal display panel including: a transparent first substrate formed with a plurality of signal electrodes and a transparent second substrate formed with a plurality of data electrodes arranged so that a face formed with the signal electrodes and a face formed with the data electrodes are opposed to each other; a liquid crystal layer sealed in a gap therebetween; pixel portions respectively constituted at portions where the signal electrodes cross over and planarly overlap the data electrodes; and color filters, in which filters of three primary colors in the form of stripes are alternately arranged to be parallel to and planarly overlap the data electrodes, provided on the first substrate or on the second substrate, a display is performed by selectively applying a voltage between the signal electrode and the opposed electrode to thereby change optical characteristics of the liquid crystal layer between the signal electrode and the opposed electrode at the pixel portion, the display is performed as follows.

A normal color display of applying selection signals to the plurality of signal electrodes constituting all the pixel portions of the color liquid crystal display panel in a time sharing manner, and applying data signals to the data electrodes in correspondence to the selection signals of the signal electrodes to allow the individual color filters of the pixel portions to be selected; and a color display of applying selection signals in such a manner to simultaneously select a plurality of the signal electrodes, and applying data signals to the plurality of data electrodes in a time sharing manner to allow the filters of a plurality of the colors in the form of stripes arranged to planarly overlap the plurality of data electrodes respectively to be individually selected and to reduce power consumption; are selectively performed.

Alternatively, a normal color display of applying selection signals to the plurality of the signal electrodes constituting all the pixel portions of the color liquid crystal display panel in a time sharing manner, and applying data signals to the data electrodes in correspondence to the selection signals of the signal electrodes to allow the filters of three primary colors in the form of stripes to be individually selected; and a black-and-white display of applying selection signals in such a manner to simultaneously select a plurality of the signal electrodes, and simultaneously applying the same data signals to three of the data electrodes on which the filters of three primary colors in the form of stripes are arranged to simultaneously select the filters of three primary colors to reduce power consumption; are selectively performed.

When the drive is performed by these methods, it is suitable that the normal color display or the full color display, and other display are switched according to time.

Further, it is suitable that the normal color display or the full color display, and other display are individually performed with a display region constituted by all the pixel portions of the color liquid crystal display panel divided into a plurality of display regions.

Furthermore, it is suitable that the normal color display or the full color display, and other display are switched according to a remaining capacity of a battery or a quantity of power generation by a power generator such as a solar cell or the like so that the normal color display or the full color display is performed when the remaining capacity of the battery or the quantity of power generation is larger than a predetermined capacity or quantity, and the other display is performed when the remaining capacity of the battery or the quantity of power generation is below the predetermined capacity or quantity.

Moreover, in the present invention, these methods are applied to a control of a display of a timepiece including a color liquid crystal display panel for displaying a time or information related to a time, wherein the color liquid crystal display panel is a liquid crystal display panel including: a transparent first substrate formed with a plurality of signal electrodes and a transparent second substrate formed with a plurality of data electrodes arranged so that a face formed with the signal electrodes and a face formed with the data electrodes are opposed to each other; a liquid crystal layer sealed in a gap therebetween; pixel portions respectively constituted at portions where the signal electrodes cross over and planarly overlap the data electrodes; and color filters, in which filters of three primary colors are alternately arranged at least at positions corresponding to the pixel portions, provided on the first substrate or on the second substrate, and displaying the time or information related to a time by selectively applying a voltage between the signal electrode and the opposed electrode to thereby change optical characteristics of the liquid crystal layer between the signal electrode and the opposed electrode at the pixel portion.

BEST MODE FOR CARRYING OUT THE INVENTION

Hereinafter, preferred embodiments for carrying out the present invention will be described with reference to the drawings.

First Embodiment

A liquid crystal display device to which the first embodiment of the present invention is applied will be explained first using FIG. 1 to FIG. 5.

Figure 1:
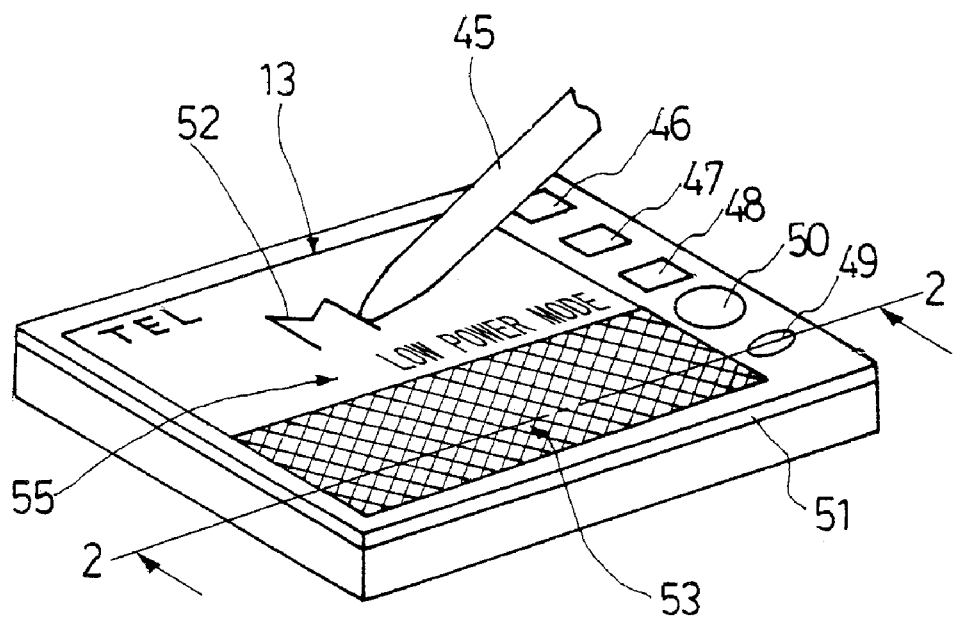
FIG. 1 is a schematic view showing a liquid crystal display device to which a first embodiment of the present invention is applied.
Figure 2:
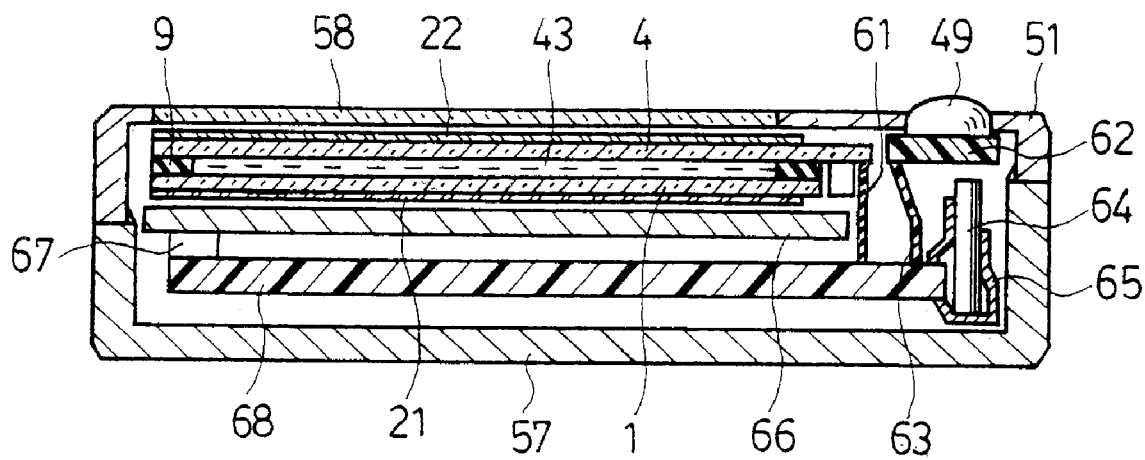
FIG. 2 is a sectional view along a line 2—2 in FIG. 1.
Figure 3:
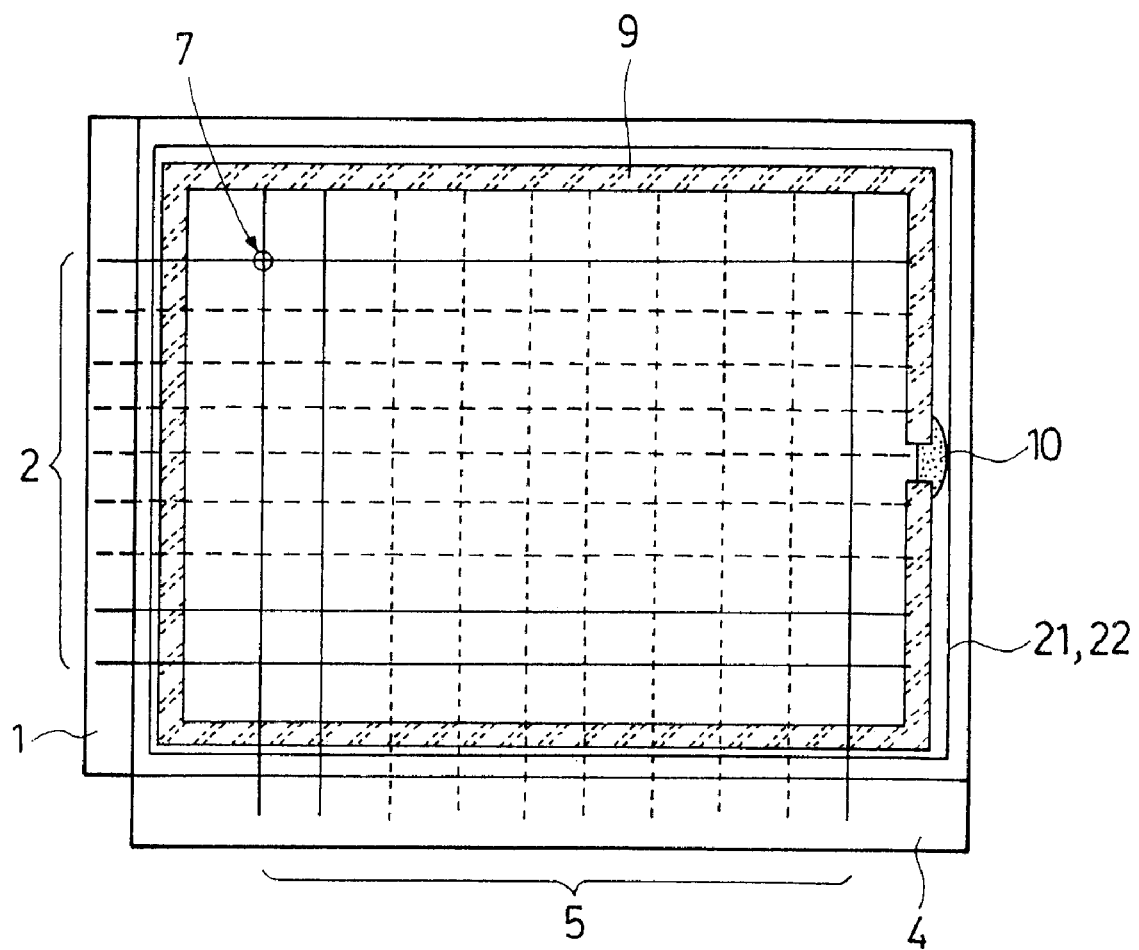
FIG. 3 is a plan view showing a liquid crystal display panel in the liquid crystal display device shown in FIG. 1.
Figure 4:
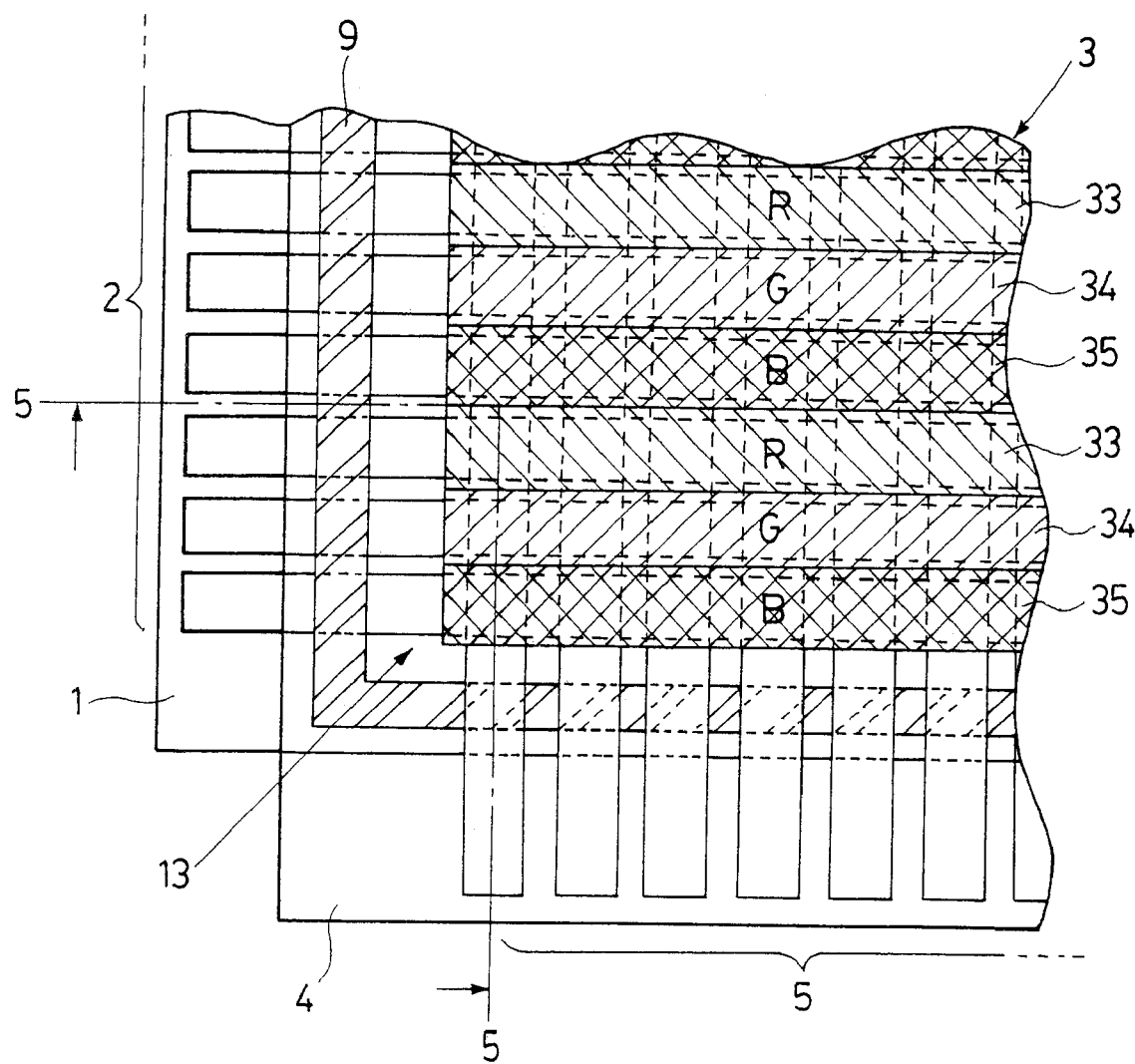
FIG. 4 is an enlarged plan view showing a part of the liquid crystal display panel shown in FIG. 3 within a circle.
Figure 5:
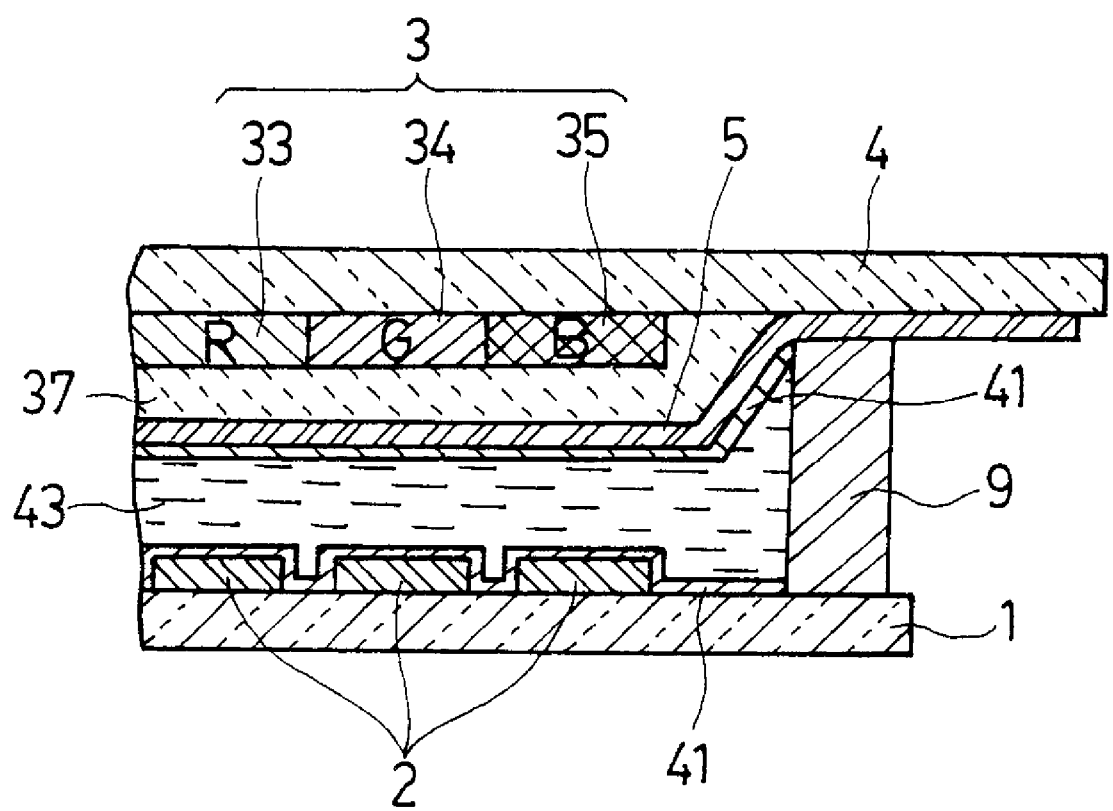
FIG. 5 is a sectional view along a line 5—5 in FIG. 4.

FIG. 1 is a schematic view showing the liquid crystal display device to which the first embodiment of the present invention is applied. FIG. 2 is a sectional view along a line 2—2 in FIG. 1. FIG. 3 is a plan view showing a liquid crystal display panel in the liquid crystal display device shown in FIG. 1. FIG. 4 is an enlarged plan view showing a part of the liquid crystal display panel shown in FIG. 3 within a circle. FIG. 5 is a sectional view along a line 5—5 in FIG. 4.

The liquid crystal display device shown in FIG. 1 is a device for performing a display in a display region 13 with the liquid crystal display panel, and has a scroll (+) button 46, a scroll (−) button 47, a mode switch button 48, a power supply switch button 49 and a speaker 50 as input/output devices or to change its display. These input/output devices are connected to a circuit board 68 through a switch board 62 as shown in FIG. 2. A liquid crystal display module composed of the liquid crystal display panel, a battery 64 and the input/output devices is installed within a case 51, a cover glass 58 and a case back 57, thereby constituting the liquid crystal display device.

Further, in the liquid crystal display device, a touch panel sensor, not shown, for recognizing an input pen 45 touching the display region 13 is provided below the cover glass 58, so that displayed information can be selected or characters can be inputted with the input pen 45.

FIG. 1 shows a state in which a character 52 of "M" is inputted with the input pen.

FIG. 1 also shows a state in which an upper half of the display region 13 of the liquid crystal display device is brought into a full color display region for performing a full color display in 512 colors, while a lower half thereof, a low power display region 53, is operated in a low power consumption (a low power) mode to perform a monochrome display, thereby reducing the electric power consumed by the liquid crystal display device. Further, a low power mode display 55 for showing this state is indicated.

In the structure of the liquid crystal display panel in the liquid crystal display device, a first substrate 1 and signal electrodes 2 are formed from the opposite side (the back side) to the cover glass 58 as shown in FIG. 5. Red (R) color filters 33, green (G) color filters 34 and blue (B) color filters 35 are provided on a second substrate 4 which is opposed to the first substrate 1 with a predetermined gap interposed therebetween. Each color filter is formed in stripe as shown in FIG. 4. In this liquid crystal display device, the color filters 33, 34 and 35 are in the form of stripes parallel to the signal electrodes 2. This does not cause color mixture even when the same data signals are applied to a plurality of data electrodes as described later, thus attaining a sharp display when using a color reducing display pattern signal, a limited color display pattern signal, or a reduced color display pattern signal.

It should be noted that the color filters 3 may be composed of three colors of cyan (C), magenta (M) and yellow (Y), or may be composed of color filters in the form of dots.

An interlayer insulation film 37 made of an acrylic resin is provided on the color filters 33, 34 and 35. Data electrodes 5 are provided on the interlayer insulation film 37. As shown in FIG. 3, a portion where the signal electrode 2 and the data electrode 5 overlap one another forms a pixel portion 7. A region where a plurality of the pixel portions 7 are arranged in matrix form is the display region 13. In this liquid crystal display device, both the signal electrodes 2 and the data electrodes 5 are in the form of stripes as shown in FIG. 4.

A liquid crystal layer 43 is provided between the first substrate 1 and the second substrate 4, and the liquid crystal layer 43 is sealed with a sealing material 9 and a closing material 10. Further, alignment films 41 made of a polyimide resin are provided on the first substrate 1 and on the second substrate 4 respectively to align the liquid crystal layer 43 in predetermined directions. In this embodiment, a twisted nematic liquid crystal is used as the liquid crystal layer 43, and is aligned in a direction of 7:30 on the first substrate 1 and in a direction of 4:30 on the second substrate 4, thereby making a twist angle of the liquid crystal layer 43 to be 90°. However, what is used as the liquid crystal layer 43 is not limited to the twisted nematic liquid crystal, but another liquid crystal, for example, a guest host-type liquid crystal, a scattering-type liquid crystal, a selective reflection-type liquid crystal or the like may be applicable.

A first polarizing film 21 composed of RDF (trade name) manufactured by 3M Ltd. is provided on the first substrate 1 as a reflection-type polarizing film. A second polarizing film 22 composed of an absorption-type polarizing film in which pigment is stretched in one direction is provided on the second substrate 4. The first polarizing film 21 and the second polarizing film 22 are arranged so that transmission axes thereof are perpendicular to each other to be brought into a state of exhibiting strong reflection characteristics when a voltage applied to the liquid crystal layer 43 is large, and exhibiting transmission characteristics when the applied voltage is small by combination with the liquid crystal display panel. This constitutes the liquid crystal display panel.

Further, in this liquid crystal display device, a light source 66 is disposed on the back side of the liquid crystal display panel to allow the liquid crystal display device to be usable in a dark environment, and the circuit board 68 is disposed on the back side of the light source 66 as shown in FIG. 2. The liquid crystal display panel is connected to the circuit board 68 with a zebra-rubber connector 61, and the light source 66 is connected to the circuit board 68 through a light source terminal 67. The zebra-rubber connector is used as the light source terminal 67, but a spring may be used.

The battery 64 is fixed to the circuit board 68 with a battery holder spring 65, and this battery 64 is an energy source of the liquid crystal display device. Further, the switch board 62 provided with switch buttons such as the power supply switch button 49 or the like is connected to the circuit board 68 through a switch FPC (Flexible Print Circuit Board) 63.

The above is the structure of the liquid crystal display device to which the first embodiment is applied, but the liquid crystal display device to which the present invention is applied is, of course, not limited to this.

Next, a driving signal of the liquid crystal display device in this embodiment will be explained.

Figure 6:
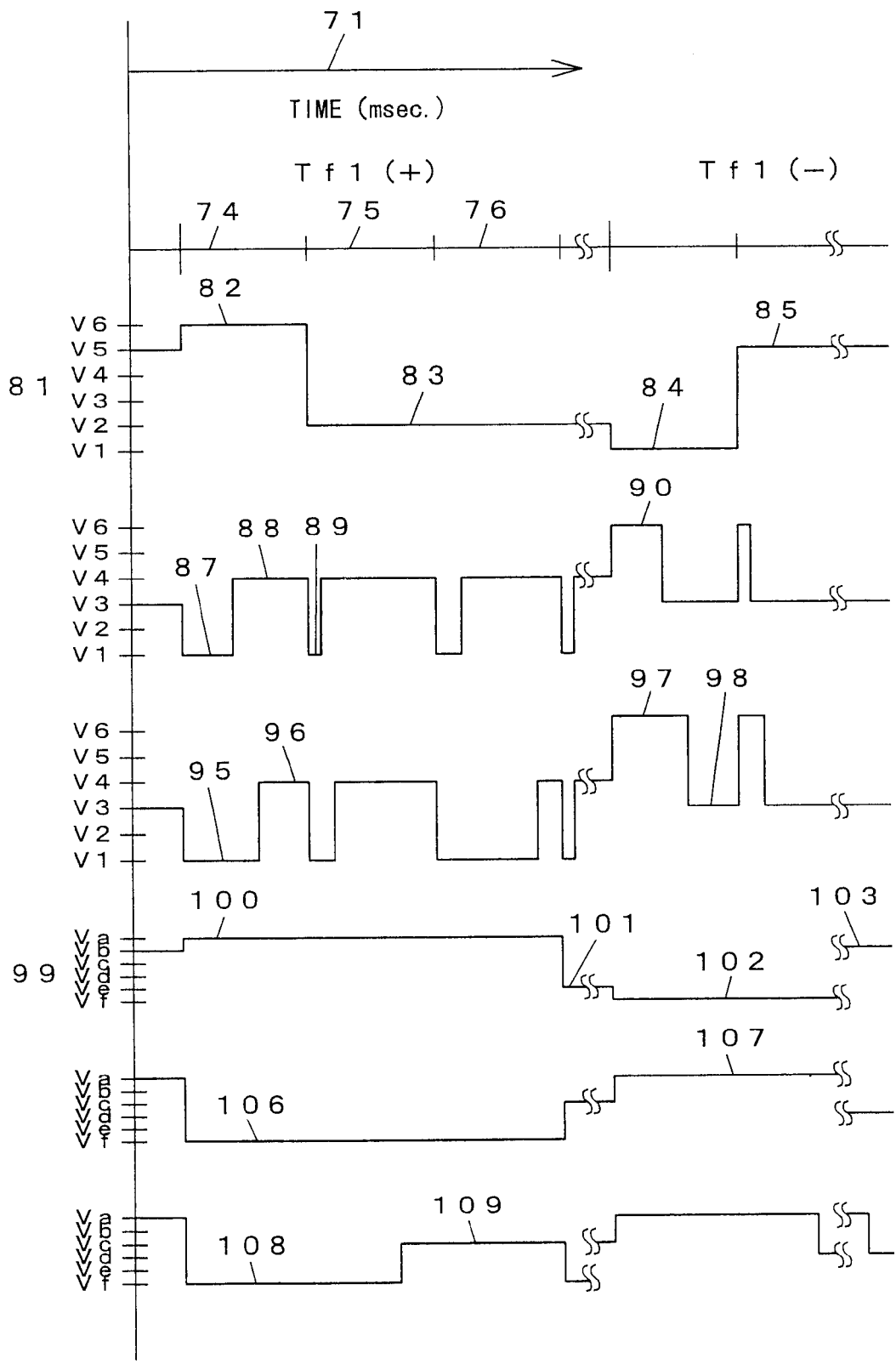
FIG. 6 is a waveform chart showing driving waveforms of the liquid crystal display panel in the first embodiment of the present invention.

A chart of driving waveforms used for the liquid crystal display device in this embodiment is shown in FIG. 6. The horizontal axis on a paper surface is a time axis 71, and alternating current waveforms having positive polarity and negative polarity are applied to each screen (field) to prevent a direct current component from being applied to the liquid crystal layer 43. Time in a positive field is represented by Tf1(+), and time in a negative field is represented by Tf1(−). In order to prevent flicker, Tf1 ranges from 16 milliseconds (msec.) to several milliseconds (msec.). When Tf1 is short, the electric current consumed by the liquid crystal display device increases due to an increase in the frequency at which the liquid crystal is driven and an increase in the voltage applied to the liquid crystal.

The liquid crystal layer 43 composed of the twisted nematic (TN) liquid crystal optically changes by an effective value of voltage applied thereto per unit time. Further, since the liquid crystal layer 43 can be described as a parallel circuit composed of a resistive component and a capacitive component in an electric equivalent circuit, consumption by the capacitive component occurs when the driving voltage is switched, and consumption by the resistive component occurs while the driving voltage is constant. An increase in the driving frequency and an increase in the driving voltage increase power consumption also in a circuit for forming driving waveforms.

First, a color display signal for performing a 512-color display will be explained. This color display signal is a full color display signal capable of performing a display at eight gradations for each color of R, G, B, and this color display signal is also a normal color display signal because a signal capable of individually selecting a color filter is a normal color display signal. The normal color display signal may naturally be one having a number of gradations fewer than that of the example shown here.

A driving voltage 81 applied to the liquid crystal layer 43 is composed of signals at six levels of V1, V2, V3, V4, V5 and V6. In Tf1(+), a selection signal is applied to a first signal electrode during a first selection period 74, a selection signal is applied to a second signal electrode during a second selection period 75, and a selection signal is applied to a third signal electrode during a third selection period 76. The other periods in Tf1(+) are periods during which selection signals are applied to the other signal electrodes.

For example, to the first signal electrode, a first selection signal 82 at V6 voltage level is applied to select this electrode during the first selection period 74, and a first non-selection signal 83 at V2 voltage level is applied during the other periods in Tf1(+). During the periods in Tf1(−), a second selection signal 84 at V1 voltage level is applied to the first signal electrode to select this electrode during a first selection period, and a second non-selection signal 85 at V5 voltage level is applied to the electrode during the other periods in Tf1(−).

To the second signal electrode, selection periods are shifted, a selection signal at V6 voltage level is applied during the second selection period 75 in Tf1(+), and a non-selection signal at V2 voltage level is applied during the other periods in Tf1(+). During the periods in Tf1(−), a second selection signal at V1 voltage level is applied during a second selection period, and a second non-selection signal at V5 voltage level is applied during the other periods in Tf1(−).

Similarly, a selection signal is applied to the third signal electrode during the third selection period 76, and a non-selection signal is applied during the other periods, in each of Tf1(+) and Tf1(−).

Selection signals and non-selection signals are also applied to the other signal electrodes in a similar time sharing manner, in which the selection signals are successively applied to the signal electrodes.

A gradation signal is applied to the data electrode as the data signal to perform the 512-color display. The driving voltage 81 is composed of six levels of V1, V2, V3, V4, V5 and V6 as in the case of the selection signal. The first embodiment employs pulse width modulation, in which a gradation display is performed by changing the width ratio between a 1st-part gradation signal and a 2nd-part gradation signal which are applied in each selection period.

For example, in each selection period in Tf1(+), a voltage at V1 as the 1st-part gradation signal and a voltage at V4 as the 2nd-part gradation signal are applied to the data electrode as gradation signal. In this event, a potential difference with respect to V6, which is the voltage level of the selection signal applied to the signal electrode, can be applied to the liquid crystal layer, causing a large potential difference V6–V1 during the 1st-part and a small potential difference V6–V4 during the 2nd-part. Therefore, by changing the ratio between the 1st-part with the large potential difference and the 2nd-part with the small potential difference, the quantity of charge applied to the liquid crystal layer is changed to perform the gradation display. In other words, the greater the width (the longer the period) of the 1st-part gradation signal is, the brighter the display of the selected pixel becomes.

In the first example shown, a first 1st-part gradation signal 87 at V1 voltage level and a first 2nd-part gradation signal 88 at V4 voltage level are first applied to a first data electrode during the first selection period 74. The period of the first 1st-part gradation signal 87 is short compared to that of the first 2nd-part gradation signal 88. Further, a second 1st-part gradation signal 89 is applied during the second selection period 75. The period of the second 1st-part gradation signal 89 is short compared to that of the first 1st-part gradation signal 87. Furthermore, the period of a 1st-part gradation signal during the third selection period 76 is shorter than that of the first 1st-part gradation signal 87 and longer than that of the second 1st-part gradation signal 79. Therefore, the arrangement of an R filter at the first signal electrode, a G filter at the second signal electrode, and a B filter at the third signal electrode produces a display in red-purple. In Tf1(−), a third 1st-part gradation signal 90 at V6 voltage level is applied during the first selection period. The voltage level of the 2nd-part gradation signal is at V3.

In the next example shown at a different point of time, a fourth 1st-part gradation signal 95 at V1 voltage level and a fourth 2nd-part gradation signal 96 at V4 voltage level are applied to the first data signal during the first selection period 74. The period of the fourth 1st-part gradation signal 95 is long compared to that of the fourth 2nd-part gradation signal 96. Further, a 1st-part gradation signal which is short compared to the fourth 1st-part gradation signal 95 is applied during the second selection period 75, and a 1st-part gradation signal which is longer than the fourth 1st-part gradation signal 95 is applied during the third selection period 76. Therefore, a display in bluish blue-purple is produced by combination with the color filters of R, G, B. In Tf1(−), a fifth 1st-part gradation signal 97 at V6 voltage level and a fifth 2nd-part gradation signal 98 at V1 voltage level are applied during the first selection period.

The driving waveforms shown in the above are signal waveforms normally used in the pulse width modulation of the liquid crystal display device which performs the 512-color display. The example in which the data signal is a gradation signal is described here, but it is also suitable that gradation information is added to the selection signal to make it a gradation signal.

Next, driving waveforms for reducing the power consumption, which are characteristics of the present invention will be explained. The characteristics are that selection signals are integrally and simultaneously applied to three signal electrodes for the R, G, B color filters to select them, and that the driving voltage is decreased. Since the R, G, B color filters are arranged to be in the form of stripes parallel to the signal electrodes, it is extremely easy to integrate the signal electrodes corresponding to the three color filters. The driving waveforms explained here are a color reducing display pattern signal for performing a color reducing display, which simultaneously selects a plurality of the signal electrodes.

The driving voltage of a low power display is a low power driving voltage 99 composed of six levels of Va, Vb, Vc, Vd, Ve and Vf. Even a weak voltage can sufficiently cause an electro-optical change in the liquid crystal layer as the selection period of the signal electrode is increased as described later, and thus the low power driving voltage 99 is a voltage smaller than the driving voltage 81 for the color display.

First, to the first signal electrode, a low power first selection signal 100 at Va voltage level is applied during a period corresponding to the first selection period 74, the second selection period 75 and the third selection period 76 in Tf1(+), and a low power first non-selection signal 101 at Ve voltage level is applied during the other periods in Tf1(+). The same signals as those applied to the first signal electrode are also applied to the second signal electrode and the third signal electrode. Similarly to these three electrodes, low power selection signals at Va voltage level are integrally applied to every group of three out of the other signal electrodes in a time sharing manner during the selection periods. Since the signal electrodes are integrated in threes, the respective selection periods are three times those of the color display and the driving frequency of the selection signal is ⅓ that of the color display.

Also in Tf1 (−), low power second selection signals 102 at Vf voltage level are applied during the periods of the three electrodes, and low power second non-selection signals 103 at Vb voltage level are applied during the other periods. Similarly to these three electrodes, low power selection signals at Vf voltage level are integrally applied to every group of three out of the other signal electrodes in a time sharing manner during a period three times that of the conventional case.

The color filters R, G, B are formed on three adjacent signal electrodes 2 as shown in FIG. 4, so that the integral selection of the three adjacent signal electrodes results in the integral selection of the color filters R, G, B.

The driving voltage of the data signal which is applied to the data electrode is also at the low power driving voltage 99 composed of six levels of Va, Vb, Vc, Vd, Ve and Vf as in the case of the selection signal.

In the first example shown, the same low power first data signal 106 at Vf voltage level is applied to the first data electrode during the first selection period 74, the second selection period 75 and the third selection period 76 in Tf1(+). A low power data signal at Vf (bright) or Vc (dark) voltage level is applied during the other periods in accordance with the display contents of other groups of three signal electrodes.

During the periods in Tf1(−), a low power second data signal 107 at Va voltage level or a low power data signal at Vd voltage level is applied. A low power data signal at Va (bright) or Vd (dark) voltage level is applied during the other periods in accordance with the display contents of other groups of three signal electrodes.

Therefore, this case provides a monochrome black-and-white binary display in which a group of three pixels of R, G, B simultaneously turn ON/OFF.

In the next example shown, a low power first 1st-part gradation signal 108 at Vf voltage level and a low power first 2nd-part gradation signal 109 at Vc voltage level are applied to the first data electrode during the first, second and third selection periods 74, 75 and 76 in Tf1(+). A low power 1st-part gradation signal at Vf voltage level and a low power 2nd-part gradation signal at Vc voltage level are also applied during the other periods in accordance with the display contents of other groups of three signal electrodes. During the periods in Tf1(−), a low power 1st-part gradation signal at Va voltage level and a low power 2nd-part gradation signal at Vd voltage level are applied.

For example, during the periods in Tf1 (+), a potential difference with respect to Va which is applied during the selection periods of the low power first selection signal can be applied to the liquid crystal layer, causing a large potential difference Va−Vf during the 1st-part period and a small potential difference Va−Vc during the 2nd-part period. Therefore, by changing the ratio between the 1st-part period with the large potential difference and the 2nd-part period with the small potential difference, the quantity of charge applied to the liquid crystal layer is changed, thereby performing the gradation display. In other words, the longer the period in which the 1st gradation signal is applied is, the brighter display the pixel provides.

That the color filters R, G, B are integrally selected is the same as in the example which is first shown, and thus this case provides a black-and white gradation display.

As is clear from the above explanation, the selection period of the selection signal in the low power display is three times as long as that in the state in which the 512-color display is preformed. Further, since three signal electrodes in every group are integrally selected, the voltage application period of the data signal is also three times as long. Therefore, the driving voltage can be reduced. Furthermore, in the first example shown, the division of the data signal applied during each period to the 1st-part gradation signal and 2nd-part gradation signal is stopped, and the binary display is provided using all the periods. The switching frequency of the voltage of the signal electrode is reduced to ⅓ as described above. Similarly, the switching frequency of the voltage of the data signal is also reduced to ⅓. Consequently, the power consumption can be reduced to ⅓ or less.

Further, the driving voltage can also be reduced. In the experiment, the driving voltage could be reduced from 5.4V to 4.25V, and its ratio of ON/OFF applied to the liquid crystal layer 43 could also be increased from 1.2 to 1.3.

As the results of the above, it is possible to attain the power consumption of the liquid crystal display device being ¼ or less that of the conventional one. The driving voltage can be reduced to 3.85 V by optimizing the bias ratio which is a width of a pitch of the driving voltage, so that the power consumption becomes ¼.2 or less. Further, as for the power consumption of an LCD controller and driver IC for generating each signal waveform, the frequency can be reduced to ⅓ to thereby reduce voltage, making it possible to reduce the power consumption of a combination of the liquid crystal and the LCD controller and driver IC to ¹⁄₁₀ or less. This suppresses the consumption of the battery, providing a liquid crystal display device friendly to the earth environment. Further, the entire display region can be displayed, each block of the signal electrodes can be driven by low power, and the color filters in the form of stripes corresponding to the signal electrodes are employed, thereby attaining excellent display quality without unevenness in display.

The gradation display is performed in the example secondly shown, in which since the selection period of the low power selection signal is three times as long as that of the color display pattern signal, the period of the low power selection signal usable for the gradation of the data signal becomes three times as long. Consequently, the applied voltage can be decreased, resulting in reduced power consumption.

The same low power selection signals are applied to every group of three signal electrodes in the first embodiment, but the same low power signals may be applied to every multiple of three, for example, six or nine, signal electrodes. The driving voltage and the power consumption can be further reduced in this case. The ratio in number between the signal electrodes and the data electrodes to which the same signals are applied respectively is made 3:1, thereby realizing a display having the same aspect ratio as that of the display using the color display pattern signal.

Second Embodiment

Figure 7:
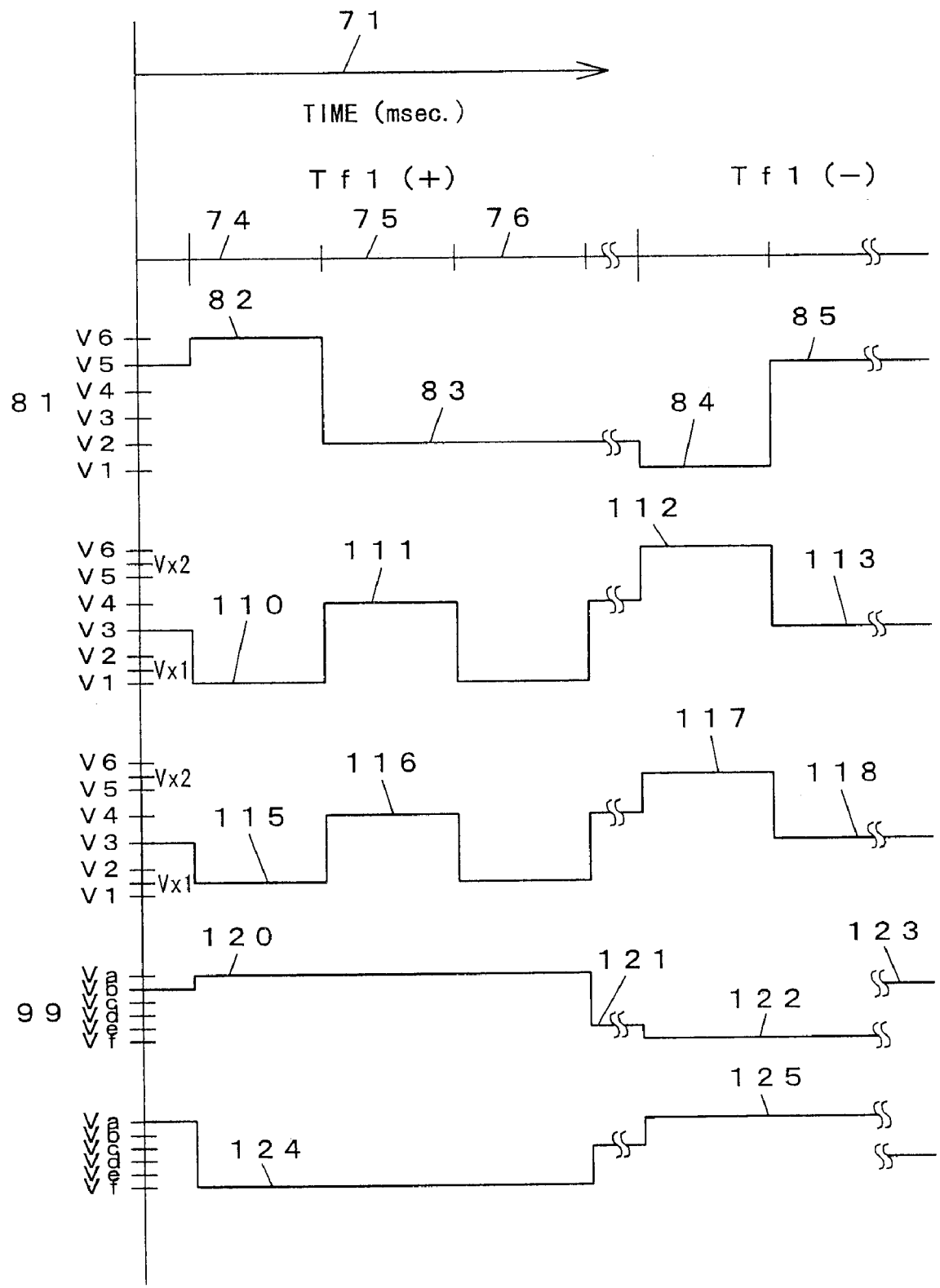
FIG. 7 is a waveform chart showing driving waveforms of the liquid crystal display panel in a second embodiment of the present invention.

Next, the second embodiment of the present invention will be explained using FIG. 7. FIG. 7 is a chart of driving waveforms used in a liquid crystal display device in this embodiment.

It should be noted that the liquid crystal display device used in the second embodiment is the same as that explained in the first embodiment except that alignment directions of a first polarizing film 21 and a second polarizing film 22 are different from those in the first embodiment, and thus the description except that is omitted.

In the liquid crystal display device used in this embodiment, the first polarizing film 21 and the second polarizing film 22 are arranged so that their transmission axes are parallel to each other, thereby providing a state of exhibiting strong reflection characteristics when a voltage applied to a liquid crystal layer 43 is small, and exhibiting transmission characteristics when the applied voltage is large by combination with a liquid crystal display panel.

Also in the waveform chart in FIG. 7, the horizontal axis on a paper surface is a time axis 71 as in FIG. 6 which is used in the description of the first embodiment, and alternating current waveforms having positive polarity and negative polarity are applied to each field to prevent a direct current component from being applied to the liquid crystal layer 43. Time in a positive field is represented by Tf1(+), and time in a negative field is represented by Tf1(−). In order to prevent flicker, Tf1 ranges from 16 milliseconds (msec.) to several milliseconds (msec.). When Tf1 is short, the electric current consumed by the liquid crystal display device increases due to an increase in the frequency at which the liquid crystal is driven and an increase in the voltage applied to the liquid crystal.

First, a color display signal for performing a 512-color display will be explained. This color display signal, similar to that described in the first embodiment, is a full color display pattern signal and also a normal color display pattern signal.

A driving voltage 81 applied to the liquid crystal layer 43 is composed of signals at six levels of V1, V2, V3, V4, V5 and V6. In Tf1(+), a selection signal is applied to a first signal electrode during a first selection period 74, a selection signal is applied to a second signal electrode during a second selection period 75, and a selection signal is applied to a third signal electrode during a third selection period 76. The other periods in Tf1(+) are periods during which selection signals are applied to the other signal electrodes.

For example, to the first signal electrode, a first selection signal 82 at V6 voltage level is applied to select this electrode during the first selection period 74, and a first non-selection signal 83 at V2 voltage level is applied during the other periods in Tf1(+). During the periods in Tf1(−), to the first signal electrode, a second selection signal 84 at V1 voltage level is applied to select this electrode during a first selection period, and a second non-selection signal 85 at V5 voltage level is applied during the other periods in Tf1 (−).

To the second signal electrode, selection periods are shifted, a selection signal at V6 voltage level is applied during the second selection period 75 in Tf1(+), and a non-selection signal at V2 voltage level is applied during the other periods in Tf1(+). During the periods in Tf1(−), a selection signal at V1 voltage level is applied during a second selection period, and a non-selection signal at V5 voltage level is applied during the other periods in Tf1 (−).

Similarly, a selection signal is applied to the third signal electrode during the third selection period, and a non-selection signal is applied during the other periods, in each of Tf1(+) and Tf1.

Selection signals and non-selection signals are also applied to the other signal electrodes in a similar time sharing manner, in which the selection signals are successively applied to the signal electrodes.

A gradation signal is applied to the data electrode as the data signal for performing a color display. The driving voltage of the data electrode is composed of eight levels including V1 to V6 and additionally V×1 and V×2 as intermediate voltages. The second embodiment employs pulse height modulation, in which a gradation display is performed by changing the magnitude of the voltage of the gradation signal which is applied during the selection period. In this embodiment, the greater the magnitude of the voltage of the gradation signal, the smaller the voltage difference between the gradation signal and the selection signal becomes during the periods in Tf1(+), resulting in a brighter display.

In the first example shown, during the periods in Tf1(+), a sixth gradation signal 110 at V1 voltage level is first applied to a first data electrode during the first selection period 74. A seventh gradation signal 111 at V4 voltage level is applied during the second selection period 75, a gradation signal at V1 voltage level is applied during the third selection period 76 as during the first selection period 74, and individual gradation signals are applied during the other selection periods in accordance with the respective display contents.

Therefore, the arrangement of an R filter at the first signal electrode, a G filter at the second signal electrode, and a B filter at the third signal electrode produces a green display. During the periods in Tf1(−), an eighth gradation signal 112 at V6 voltage level is applied during the first selection period, and a ninth gradation signal 113 at V3 voltage level is applied during the second selection period.

In the next example shown at a different point of time, during the periods in Tf1(+), a tenth gradation signal 115 at V×1 voltage level which is an intermediate level between V1 and V2 is applied to the first data electrode during the first selection period 74. Further, an eleventh gradation signal 116 at V4 voltage level is applied during the second selection period 75. A gradation signal at V×1 voltage level is applied during the third selection period 76 as during the first selection period 74, and individual gradation signals are applied during the other selection periods in accordance with the respective display contents.

Therefore, the arrangement of an R filter at the first signal electrode, a G filter at the second signal electrode, and a B filter at the third signal electrode produces a display in a color of green mixed with pale red and blue. During a period 73 in Tf1(−), a twelfth gradation signal 117 at V×2 voltage level is applied during the first selection period, and a thirteenth gradation signal 118 at V3 voltage level is applied during the second selection period.

The waveforms shown in the above are waveforms normally used in the pulse height modulation of the liquid crystal display device for performing the 512-color display.

Next, driving waveforms for reducing the power consumption which are characteristics of the present invention will be explained. The characteristics are that the selection period of the signal electrode is increased, that the driving voltage is reduced, and that the data signal is binarized. The waveforms which are explained here are a color reducing display pattern signal which simultaneously selects a plurality of the signal electrodes.

The driving voltage of a low power display is a low power driving voltage 99 composed of six levels of Va, Vb, Vc, Vd, Ve and Vf. Even a weak voltage can sufficiently cause an electro-optical change in the liquid crystal layer as the selection period of the signal electrode is increased as described later, and thus the low power driving voltage 99 is a voltage smaller than the driving voltage 81 for the color display.

First, to the first signal electrode, a low power third selection signal 120 at Va voltage level is applied during a period corresponding to the first selection period 74, the second selection period 75 and the third selection period 76 in Tf1(+), and during the other periods in Tf1(+), a low power third non-selection signal 121 at Ve voltage level is applied. The same signals as those applied to the first signal electrode are also applied to the second signal electrode and the third signal electrode. Similarly to these three electrodes, low power selection signals at Va voltage level are integrally applied to every group of three out of the other signal electrodes in a time sharing manner during the selection periods. Since the signal electrodes are integrated in threes, the respective selection periods are three times those of the full color display and the driving frequency of the selection signal is ⅓ thereof.

Also in Tf1 (−), low power fourth selection signals 122 at Vf voltage level are applied during the periods of the three electrodes, and low power fourth non-selection signals 123 at Vb voltage level are applied during the other periods. Similarly to these three electrodes, low power selection signals at Vf voltage level are integrally applied to every group of three out of the other signal electrodes in a time sharing manner during a period three times that of the conventional case.

The R, G, B color filters 3 are formed on three adjacent signal electrodes 2 as shown in FIG. 4, so that the integral selection of the three adjacent electrodes results in the integral selection of the color filters R, G, B.

The driving voltage of the data signal which is applied to the data electrode is also at the low power driving voltage 99 composed of six levels of Va, Vb, Vc, Vd, Ve and Vf as in the case of the selection signal.

The same low power third data signal 124 at Vf voltage level is applied to the first data electrode during the first selection period 74, the second selection period 75 and the third selection period 76. A low power data signal at Vf (dark) or Vc (bright) voltage level is applied during the other periods in accordance with the display contents of other groups of three signal electrodes.

Therefore, this embodiment provides a black-and-white binary display in which a group of three pixels of R, G, B simultaneously turn ON/OFF.

During the periods in Tf1 (−), a low power fourth data signal 125 at Va voltage level or a low power data signal at Vd voltage level is applied. A low power data signal at Va (dark) or Vd (bright) voltage level is applied during the other periods in accordance with the display contents of other groups of three signal electrodes.

As is clear from the above explanation, the selection period of the signal electrode in the low power display is three times as long as that in the state in which the 512-color display is performed. Further, since three signal electrodes in every group are integrally selected, the voltage application period of the data signal is also three times as long. Therefore, the driving voltage can be reduced. Further, the switching frequency of the voltage of the signal electrode is reduced to ⅓. Similarly, the switching frequency of the voltage of the data signal is also reduced to ⅓. Consequently, the power consumption can be reduced to ⅓ or less.

Further, the driving voltage can also be reduced. In the experiment, the driving voltage could be reduced from 5.4 V to 4.25 V, and its ratio of ON/OFF applied to the liquid crystal layer 43 could also be increased from 1.2 to 1.3.

As the results of the above, it is possible to attain the power consumption of the liquid crystal display device being ¼ or less that of the conventional one. The driving voltage can be reduced to 3.85 V by optimizing the bias ratio which is a width of a step of the driving voltage, so that the power consumption becomes ¼.2 or less. Further, as for the power consumption of an LCD controller and driver IC for generating each signal waveform, the frequency can be reduced to ⅓ to thereby reduce voltage, making it possible to reduce the power consumption of a combination of the liquid crystal and the LCD controller and driver IC to ¹/₁₀ or less. This suppresses the consumption of the battery, providing a liquid crystal display device friendly to the earth environment. Further, the entire display region can be displayed, each block of the signal electrodes can be driven by low power, and the color filters in the form of stripes corresponding to the signal electrodes are employed, thereby attaining excellent display quality without unevenness in display.

Furthermore, the use of a white display and a black display using three colors provides a bright display and an excellent contrast ratio, thereby making it possible to recognize the display sufficiently even in a somewhat dark environment of the liquid crystal display device in use. Consequently, it is possible to suppress lighting of a light source and to reduce the illuminance of the light source. It is suitable to use means for reducing the illuminance of the light source in combination in the case of the low power mode.

It should be noted that the example in which the low power data signal is binary, ON/OFF, is shown here, but it is suitable to allow the low power data signal to take a voltage at an intermediate level between ON and OFF, for example, Vd or Ve during the periods in Tf1(+) to perform the gradation display.

Third Embodiment

Figure 8:
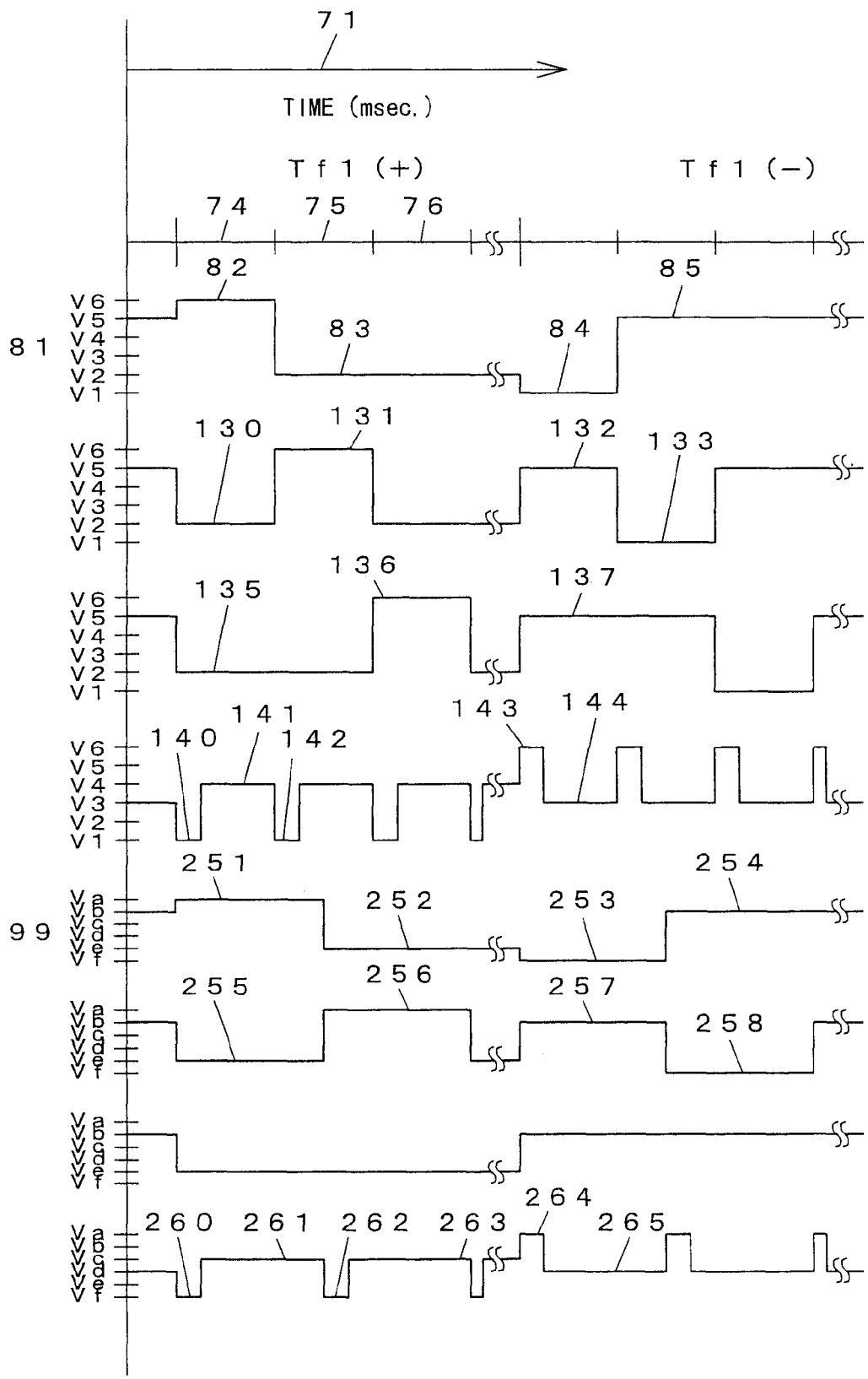
FIG. 8 is a waveform chart showing driving waveforms of the liquid crystal display panel in a third embodiment of the present invention.

Next, the third embodiment of the present invention will be explained using FIG. 8. FIG. 8 is a chart of driving waveforms used in a liquid crystal display device in this embodiment.

It should be noted that the liquid crystal display device used in the third embodiment is the same as that explained in the first embodiment, and thus the description thereof is omitted.

Also in the waveform chart in FIG. 8, the horizontal axis on a paper surface is a time axis 71 as in FIG. 6 which is used in the description of the first embodiment, and alternating current waveforms having positive polarity and negative polarity are applied to each field to prevent a direct current component from being applied to the liquid crystal layer 43. Time in a positive field is represented by Tf1(+), and time in a negative field is represented by Tf1(−). In order to prevent flicker, Tf1 ranges from 16 milliseconds (msec.) to several milliseconds (msec.). When Tf1 is short, the electric current consumed by the liquid crystal display device increases due to an increase in the frequency at which the liquid crystal is driven and an increase in the voltage applied to the liquid crystal.

First, a color display signal for performing a 512-color display will be explained. This color display signal, simialr to that described in the first embodiment, is a full color display pattern signal and also a normal color display pattern signal.

A driving voltage 81 applied to the liquid crystal layer 43 is composed of signals at six levels of V1, V2, V3, V4, V5 and V6. In Tf1(+), a selection signal is applied to a first signal electrode during a first selection period 74, a selection signal is applied to a second signal electrode during a second selection period 75, and a selection signal is applied to a third signal electrode during a third selection period 76. The other periods in Tf1(+) are periods during which selection signals are applied to the other signal electrodes.

To the first signal electrode, a first selection signal 82 at V6 voltage level is applied to select this electrode during the first selection period 74, and a first non-selection signal 83 at V2 voltage level is applied during the other periods in Tf1 (+). During the periods in Tf1 (−), a second selection signal 84 at V1 voltage level is applied to select this electrode during a first selection period, and a second non-selection signal 85 at V5 voltage level is applied during the other periods in Tf1(−).

To the second signal electrode, a third selection signal 131 at V6 voltage level is applied to select this electrode during the second selection period 75, and a third non-selection signal 130 at V2 voltage level is applied during the other periods in Tf1(+). During the periods in Tf1(−), a fourth selection signal 133 at V1 voltage level for selecting this electrode and a fourth non-selection signal 132 at V5 voltage level are applied.

To the third signal electrode, a fifth selection signal 136 at V6 voltage level is applied to select this electrode during the third selection period 76 in Tf1(+), and a fifth non-selection signal 135 at V2 voltage level is applied during the other periods in Tf1(+). During the periods in Tf1(−), a selection signal at Vl voltage level for selecting this electrode and a sixth non-selection signal 137 at V5 voltage level are applied.

Selection signals and non-selection signals which are time-divided are also applied to the other signal electrodes, in which the selection signals for the signal electrodes are successively applied.

As described above, the selection periods of the signal electrodes are successively delayed in a time sharing manner, and the periods other than the selection periods are non-selection periods.

A gradation signal is applied to the data electrode as the data signal to perform the 512-color display. The driving voltage 81 is composed of six levels of V1, V2, V3, V4, V5 and V6 as in the case of the selection signal. The fourth embodiment employs, as in the first embodiment, pulse width modulation, in which a gradation display is performed by changing the width ratio between a 1st-part gradation signal and a 2nd-part gradation signal which are applied during the first selection period 74.

A fourteenth 1st-part gradation signal 140 at V1 voltage level and a fourteenth 2nd-part gradation signal 141 at V4 voltage level are first applied to the first data electrode during the first selection period 74. The period of the fourteenth 1st-part gradation signal 140 is short compared to the period of the fourteenth 2nd-part gradation signal 141. Further, a fifteenth 1st-part gradation signal 142 at V1 voltage level and a 2nd-part gradation signal at V4 voltage level are applied during the second selection period 75, and a pair of 1st-part gradation signal and 2nd-part gradation signal are similarly applied during the other selection periods. In Tf1(−), a sixteenth 1st-part gradation signal 143 at V6 voltage level and a sixteenth 2nd-part gradation signal 144 at V3 voltage level are applied during the first selection period. In the example shown here, the color filters of R, G, B are arranged at the first, second and third signal electrodes respectively, producing a dark gray display in which all the pixels are dark.

The driving waveforms shown in the above are signal waveforms normally used in the pulse width modulation of the liquid crystal display device for performing the 512-color display.

Next, driving waveforms for reducing the power consumption which are characteristics of the present invention will be explained. The characteristics are that the data signal performs a display at only two gradations of ON and OFF, and the selection signal performs a display with two selected electrodes and the other non-selected one in every group of three electrodes. It is preferable to use color filters in the form of stripes which are arranged parallel to the signal electrodes when a character is displayed. What is explained here is a limited color display pattern signal for performing a limited color display in which part of the signal electrodes in a group is non-selected or stopped.

In this embodiment, the driving voltage of a low power display is composed of six levels of Va, Vb, Vc, Vd and Vf. Even a weak voltage can sufficiently cause an electro-optical change in the liquid crystal layer as the selection period of the signal electrode is increased as described later, and thus a low power driving voltage 99 is a voltage smaller than the driving voltage 81 for the color display.

In this embodiment, since no selection signal is applied to the third signal electrode, selection signals may be applied to two signal electrodes of the first signal electrode and the second signal electrode in three selection periods of the first, second and third selection periods 74, 75 and 76.

Therefore, a low power seventh selection signal 251 at Va voltage level is applied first to the first signal electrode during the first selection period 74 and the first half of the second selection period 75 in Tf1(+), and a low power seventh non-selection signal 252 at Ve voltage level is applied during the other periods in Tf1(+). A low power ninth selection signal 256 at Va voltage level is applied to the second signal electrode during the second half of the second selection period 75 and the third selection period in Tf1(+), and a low power ninth non-selection signal 255 at Ve voltage level is applied during the other periods in Tf1(+). No selection signal is applied to the third signal electrode, but a low power non-selection signal at Ve voltage level is applied.

As for the other signal electrodes, for example, low power selection signals, which are the same as those to the first and second signal electrodes, are applied to fourth and fifth signal electrodes respectively, and no selection signal is applied to a sixth signal electrode. In such a manner, low power selection signals are applied to two out of three signal electrodes in every group and not to the remaining one. The low power selection signals are, of course, applied in a time sharing manner.

A low power eighth selection signal 253 at Vf voltage level is applied to the first signal electrode during the first selection period and the first half of the second selection period in Tf1(−), and a low power eighth non-selection signal 254 at Vb voltage level is applied during the other periods in Tf1(−). A low power tenth selection signal 258 at Vf voltage level is applied to the second signal electrode during the second half of the second selection period and the third selection period, and a low power tenth non-selection signal 257 at Vb voltage level is applied during the other periods in Tf1(−). No selection signal is applied to the third signal electrode, but a low power nonselection signal at Vb voltage level is applied.

Next, a low power data signal which is applied to a data electrode will be explained. The driving voltage of the low power data signal is also composed of six levels of V1, V2, V3, V4, V5 and V6.

A low power second 1st-part gradation signal 260 at Vf voltage level and a low power second 2nd-part gradation signal 261 at Vc voltage level are applied to a first data electrode during the first selection period 74 and the first half of the second selection period 75 which are the periods during which the first signal electrode is selected in Tf1(+). A low power third 1st-part gradation signal 262 at Vf voltage level and a low power third 2nd-part gradation signal 263 at Vc voltage level are applied during the second half of the second selection period 75 and the third selection period 76 which are the periods during which the second signal electrode is selected. A low power gradation signal at Vf or Vc voltage level is applied during the other periods in accordance with the display contents of other signal electrodes.

A low power fourth 1st-part gradation signal 264 at Va voltage level and a low power fourth 2nd-part gradation signal 265 at Vd voltage level are applied during the periods in Tf1 (−) in accordance with the display contents of the signal electrodes.

Therefore, the R, G, B color filters 3 are arranged at the first, second and third signal electrodes respectively, displaying red and green pixels in dark conditions, resulting in a display in dark yellow. Further, colors which can be presented by mixing red and green can be displayed by changing the period ratio between the low power 1st-part gradation signal and the low power 2nd-part gradation signal.

Further, the use of the liquid crystal display panel which is in a black display where no voltage is applied makes it possible to keep contrast even if there is a signal electrode to which no selection signal is applied.

As is clear from the above explanation, the selection period of the signal electrodes in the low power display is 1.5 times as long as that in the state in which the 512-color display is performed. Further, the voltage application period of the data signal is also 1.5 times as long. Therefore, the driving voltage can be reduced. The switching of the voltage of the signal electrode is reduced to $2/3$ because the selection period is 1.5 times as long. The switching of the voltage of the data electrode is similarly reduced to $2/3$. Consequently, the power consumption can be reduced to ⅔ or less. Further, the driving voltage can be reduced.

Moreover, colors can be changed by selecting signal electrodes to which no selection signal is applied in accordance with use environments, enabling realization of both securement of visibility and low power consumption. Although two out of three signal electrodes are selected here, it is also suitable to select one signal electrode.

Further, the number of gradations of the voltage applied to the data signal is reduced to thereby simplify its driving circuit, making it possible to further reduce the power consumption.

Fourth Embodiment

Figure 9:
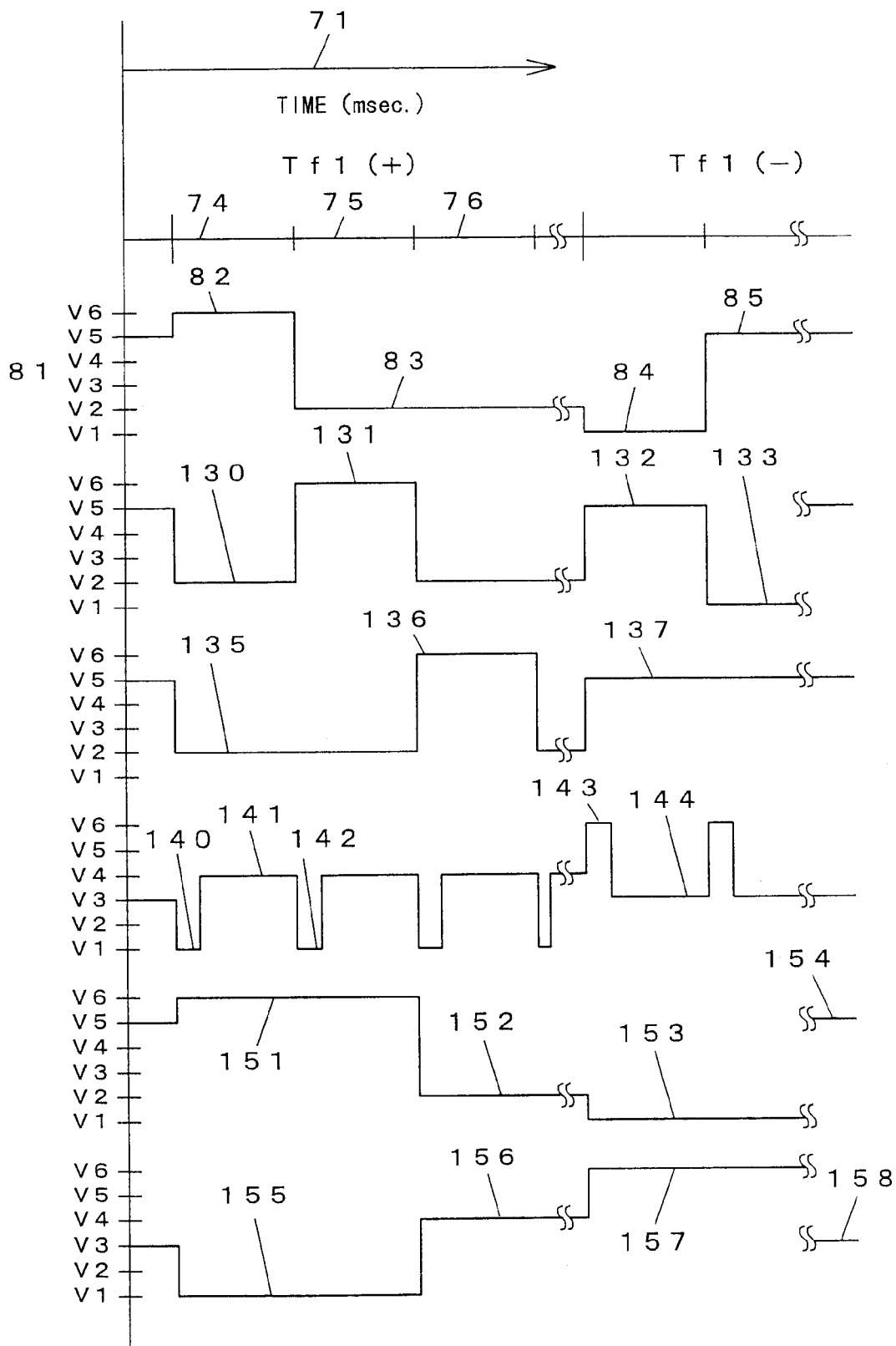
FIG. 9 is a waveform chart showing driving waveforms of the liquid crystal display panel in a fourth embodiment of the present invention.

Next, the fourth embodiment of the present invention will be explained using FIG. 9. FIG. 9 is a chart of driving waveforms used in a liquid crystal display device in this embodiment.

It should be noted that the liquid crystal display device used in the fourth embodiment is also the same as that explained in the first embodiment, and thus the description thereof is omitted.

Further, upper four signals showing a color display signal in the waveform chart in FIG. 9 are the same as those explained in the third embodiment using FIG. 8, and thus the description thereof is also omitted.

What is explained in this embodiment is a low power driving signal having both characteristics of a limited color display pattern signal for applying selection signals only to part of signal electrodes and a color reducing display signal for simultaneously selecting a plurality of signal electrodes.

In this embodiment, the driving voltage of a low power display is composed of six levels of V1, V2, V3, V4, V5 and V6 as in the case of the color display signal.

To a first signal electrode, a low power eleventh selection signal 151 at V6 voltage level is applied during a period corresponding to a first selection period 74 and a second selection period 75 in Tf1(+), and a low power eleventh non-selection signal 152 at V2 voltage level is applied during the other periods in Tf1(+). The same signal as that applied to the first signal electrode is also applied to a second signal electrode. No selection signal is applied to a third signal electrode. As for the other signal electrodes, for example, low power selection signals are applied to fourth and fifth signal electrodes during the same periods, and no selection signal is applied to a sixth electrode. In such a manner, low power selection signals are applied to two out of three electrodes in every group and not to the remaining one. The low power selection signals are, of course, applied in a time sharing manner to every group of two signal electrodes.

A low power twelfth selection signal 153 at V1 voltage level is applied to the first signal electrode during a period corresponding to the first selection period and the second selection period in Tf1(−). A low power twelfth non-selection signal 154 at V5 voltage level is applied during the other periods in Tf1(−). A signal which is the same as that of the first signal electrode is also applied to the second signal electrode. No selection signal is applied to the third signal electrode. Selection signals of Tf1(−) are also applied to the other signal electrodes in the time sharing manner as in the case of Tf1(+)

Next, a low power data signal which is applied to a data electrode will be explained. The driving voltage of the low power data signal is also composed of six levels of V1, V2, V3, V4, V5 and V6.

The same low power eighth data signal 155 at V1 voltage level is applied to the first data electrode during the first selection period 74 and the second selection period 75. A low power ninth data signal 156 at V4 voltage level is applied during the third selection period 76. A low power data signal at V1 (bright) or V4 (dark) voltage level is applied during the other periods in accordance with the display contents of other groups of three signal electrodes.

A low power tenth data signal 157 at V6 voltage level or a low power eleventh data signal 158 at V3 voltage level is applied during the periods in Tf1 (−) in accordance with the display contents.

Accordingly, the case which is described here provides a display in which a pixel of yellow made by mixing red and green turns ON/OFF.

As is clear from the above explanation, the selection period of the signal electrode in the low power display is twice as long as that in the state in which a 512-color display is performed. Further, the voltage application period of the data signal is also twice as long. Therefore, the driving voltage can be reduced. Furthermore, the division into the 1st-part gradation signal and the 2nd-part gradation signal is stopped, and a binary display is provided using all the periods. Accordingly, the switching of the voltage of the signal electrode is reduced to half because the selection period is twice as long. The switching of the voltage of the data electrode is similarly reduced to half. Consequently, the power consumption can be reduced to half or less. Further, the driving voltage can be reduced.

Moreover, the selection period for application to the signal electrode is increased, thereby reducing the driving frequency. Further, a plurality of signal electrodes are simultaneously selected to make the display as bright as possible and to add color information, thereby improving visibility. Furthermore, display colors can be changed by changing electrodes to which selection signals are applied, so that colors are changed in accordance with use environments to enable realization of both securement of visibility and low power consumption. Further, the number of gradations of voltage applied to the data electrodes is reduced to thereby simplify its driving circuit, making it possible to reduce the power consumption.

Although two out of three signal electrodes are selected here, it is also suitable to select one signal electrode. Further, it is also possible to divide the low power data signal into a 1st-part gradation signal and a 2nd-part gradation signal to perform the gradation display.

Fifth Embodiment

Figure 10:
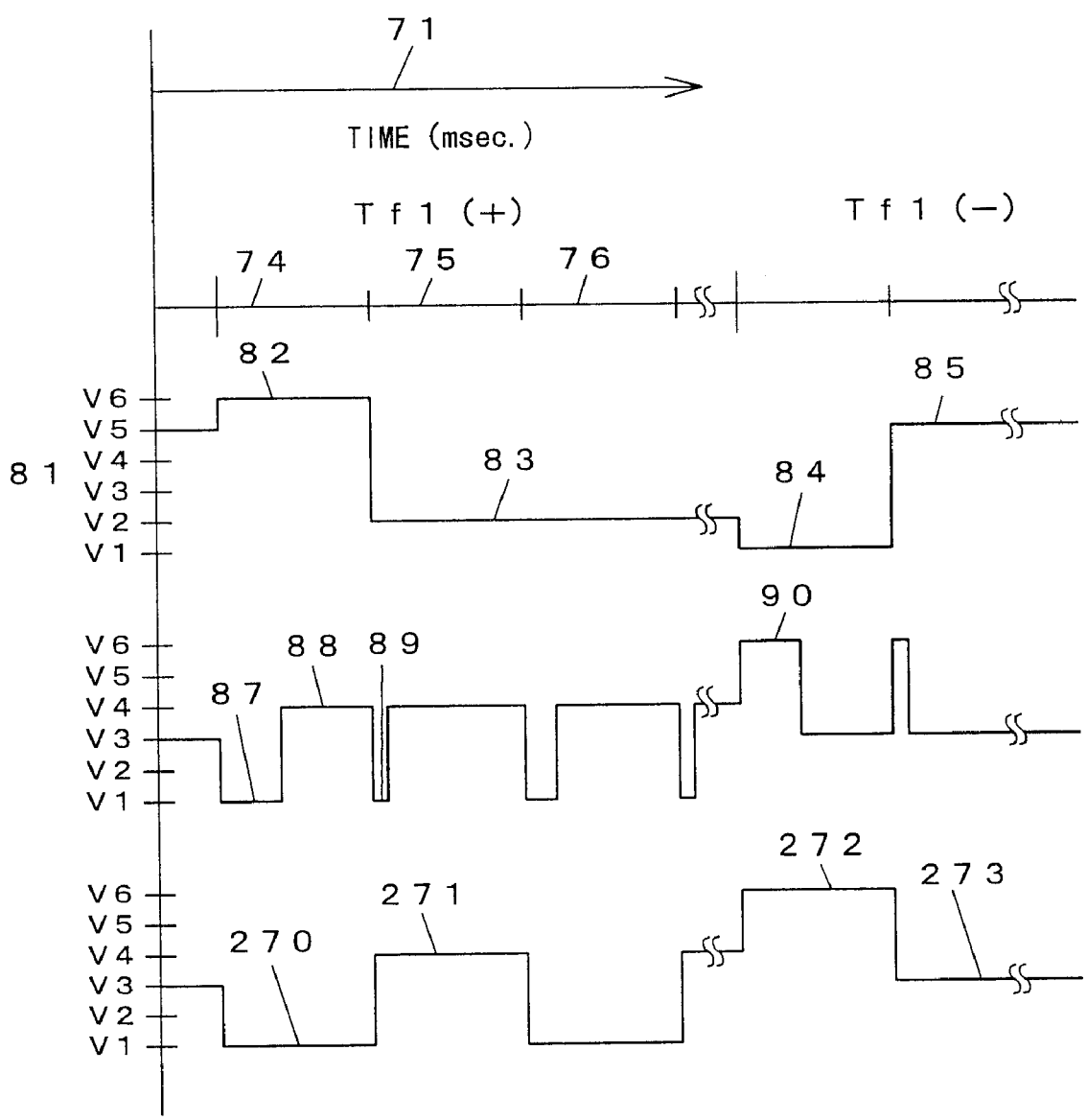
FIG. 10 is a waveform chart showing driving waveforms of the liquid crystal display panel in a fifth embodiment of the present invention.

Next, the fifth embodiment of the present invention will be explained using FIG. 10. FIG. 10 is a chart of driving waveforms used in a liquid crystal display device in this embodiment.

It should be noted that the liquid crystal display device used in the fifth embodiment is also the same as that explained in the first embodiment, and thus the description thereof is omitted.

Further, upper two signals showing a full color display signal in the waveform chart in FIG. 10 are the same as those explained in the first embodiment using FIG. 6, and thus the description thereof is also omitted.

What is explained in this embodiment is a reduced color display pattern signal for performing a reduced color display in which R, G, B filters can be selected with their gradation individually reduced.

In this embodiment, the driving voltage of a low power display is composed of six levels of V1, V2, V3, V4, V5 and V6 as in the case of the full color display signal. As in the case of the full color display, a selection signal at V6 voltage level is applied to each signal electrode during a selection period corresponding to each signal electrode in Tf1(+), and a non-selection signal at V2 voltage level is applied during the other periods in Tf1(+). A selection signal at V1 voltage level is applied during a selection period corresponding to each signal electrode in Tf1 (−), and a non-selection signal at V5 voltage level is applied during the other periods in Tf1 (−).

Next, a low power data signal which is applied to a data electrode will be explained. The driving voltage of the low power data signal is also composed of six levels of V1, V2, V3, V4, V5 and V6.

The low power data signal for each pixel portion in this embodiment, different from the data signal for the full color display, is not divided into a 1st-part gradation signal and a 2nd-part gradation signal, and is made a binary data signal only with ON/OFF.

In the example shown in the drawing, a low power tenth data signal 270 at V1 voltage level is applied to a first data electrode during the first selection period 74 and the third selection period 76 in Tf1(+), and a low power eleventh data signal 271 at V4 voltage level is applied during the second selection period 75. A low power data signal at V1 (bright) or V4 (dark) voltage level is applied during the other periods in accordance with the display contents of other signal electrodes.

A low power twelfth data signal 272 at V6 voltage level (bright) or a low power thirteenth data signal 273 at V3 voltage level (dark) is applied during the periods in Tf1(−) in accordance with the display contents of the signal electrode.

The arrangement of R, G, B color filters 3 respectively at the first, second and third signal electrodes provides a display in a color of magenta made by mixing red and blue in the case described here.

As is clear from the above explanation, the number of gradations of the voltage applied to the data signal is reduced in the reduced color display as compared with the state in which a 512-color display is performed to thereby simplify its driving circuit, making it possible to reduce the power consumption.

The data signal is made binary of ON/OFF here, but the data signal at eight gradations is made to be at four gradations, thereby also providing effect of reducing power consumption.

Sixth Embodiment

Figure 11:
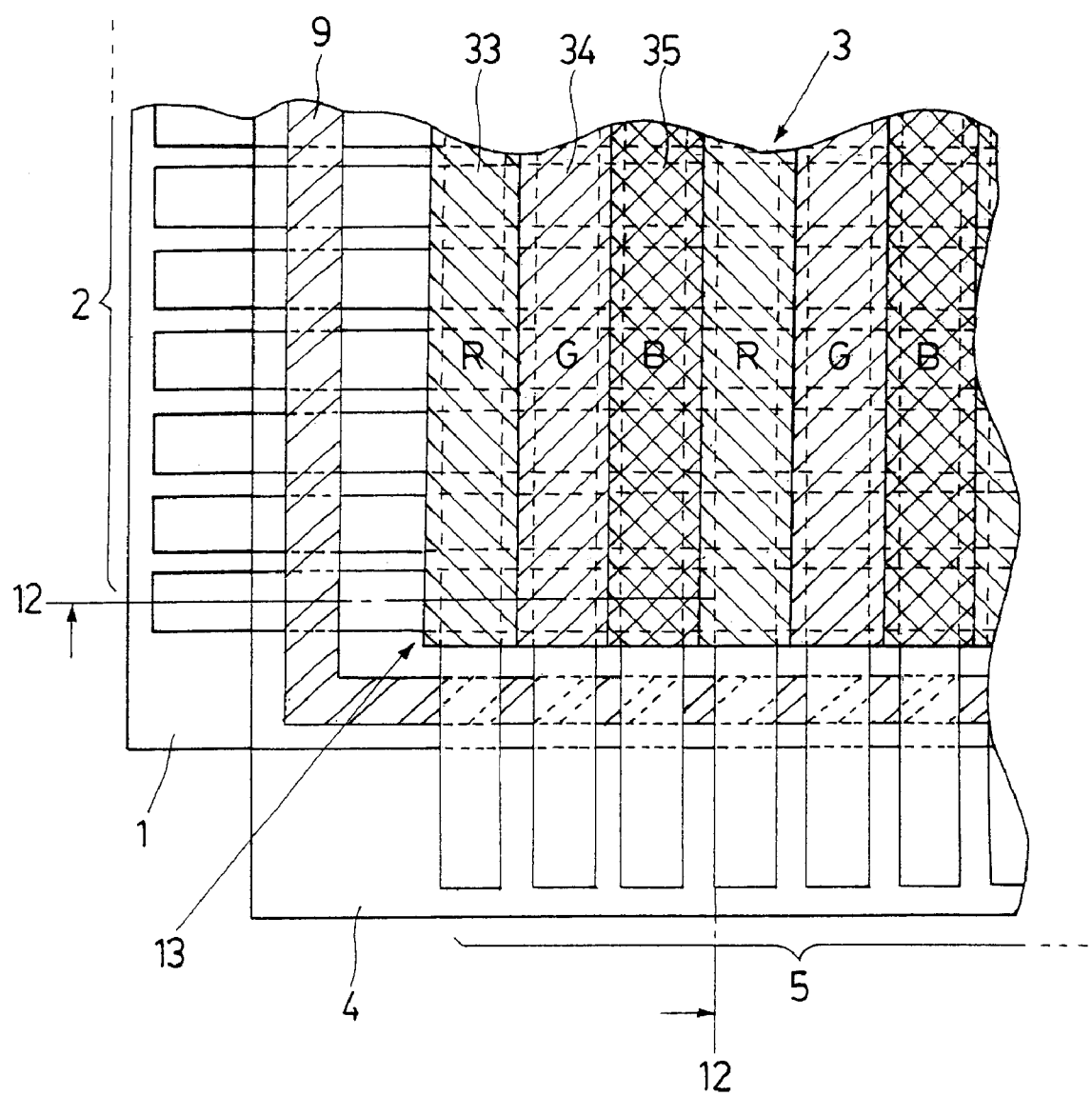
FIG. 11 is a plan view, similar to FIG. 4, of a liquid crystal display device to which a sixth embodiment of the present invention is applied.
Figure 12:
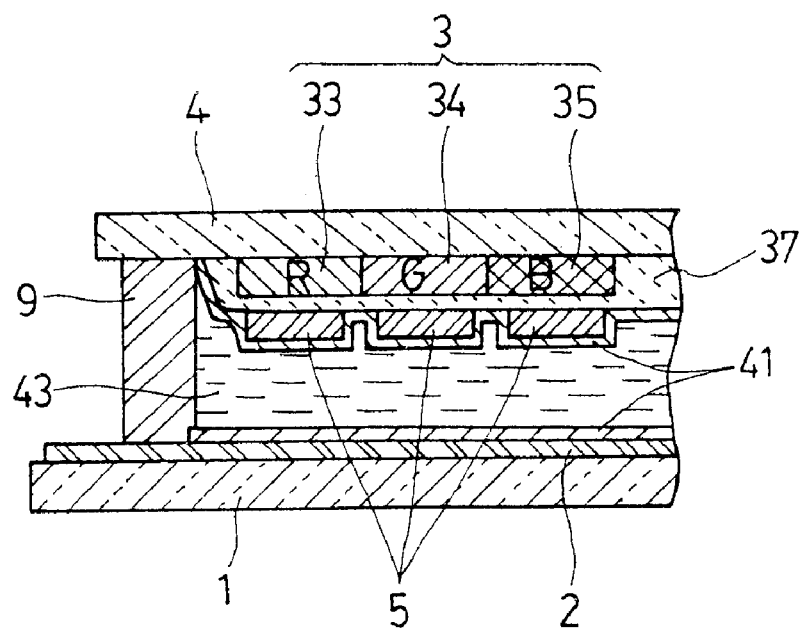
FIG. 12 is a sectional view along a line 12—12 in FIG. 11.

Next, the sixth embodiment of the present invention will be explained using FIG. 6, FIG. 11 and FIG. 12. FIG. 11 is a plan view, similar to FIG. 4, of a liquid crystal display device to which this embodiment is applied. FIG. 12 is a sectional view along a line 12—12 in FIG. 11.

In this liquid crystal display device used in the sixth embodiment, red (R) color filters 33, green (G) color filters 34 and blue (B) color filters 35 in the form of stripes are provided parallel to data electrodes 5 as shown in FIG. 11 and FIG. 12. This liquid crystal display device is different only in this point from the liquid crystal display device which is described in the first embodiment, and thus the description of the other points is omitted.

This liquid crystal display device can individually control the gradations of pixels of R, G, B even if the color display signal which is explained in the first embodiment using FIG. 6 is applied thereto, therefore performing a 512-color display which is the full color display and the normal color display which are the same as those of the first embodiment.

This embodiment is characterized in that a color display can be performed even if the reduced color display signal shown in FIG. 6 is used for performing the display.

In this liquid crystal display device, the same low power selection signals composed of a low power first selection signal 100, a low power non-selection signal 101 and the like are applied to a first through a third signal electrode to simultaneously select them, not leading to the integral selection of three color filters as distinct from the case of the first embodiment.

Low power data signals are applied to the data signals one by one to individually select respective pixels of R, G, B, thereby performing the normal color display. Particularly when a gradation display is performed using a low power first 1st-part gradation signal 108 and a low power first 2nd-part gradation signal 109, a full color display can be performed in which the pixels of R, G, B are selected with gradations respectively. In other words, a color display at the same level as that by the color display signal can be performed using the reduced color display signal.

On the other hand, the applied signal is the same as that which is explained in the first embodiment, and thus the low power effect as is explained in the first embodiment can be obtained. Accordingly, the color display with reduced power consumption can be performed in this embodiment.

However, since three signal electrodes are simultaneously selected, the display contents are stretched three times as long as that of the display by the color display signal in a direction in which the signal electrodes are arranged. Therefore, a figure such as a circle or the like is low in accuracy, but a display of character or number can be sufficiently recognized and effective.

Further, by applying the same low power data signals to every group of nine data electrodes (three groups of R, G, B), the display contents are stretched three times as long respectively in directions in which the signal electrodes and data electrodes are arranged, thereby performing a display, a black-and-white display, having the same aspect ratio as that of the display by the color display signal.

Furthermore, the data electrodes are made into groups in threes composed of R, G, B, and the same low power data signals are applied to R and G, and a signal for always providing black is applied to B, thereby also enabling the limited color display of performing a display in yellow and black. Similarly, it is also possible to apply the same low power data signals to R and B or G and B.

The number of the data electrodes to which the low power data signals are applied is selected to thereby change the number of feasible colors as described above, achieving reduced power consumption. Therefore, it is extremely effective to employ the color reducing display pattern signal to a liquid crystal display device having a liquid crystal display panel with a structure in which color filters are disposed on the data electrodes.

Although the example in which three signal electrodes are simultaneously selected is shown here, the number of the signal electrodes simultaneously selected may be any number which is two or more. The greater number of the signal electrodes are simultaneously selected, the greater the effect of reducing power consumption is. The display, however, is correspondingly stretched in the direction in which the signal electrodes are arranged, lowering the display quality, and thus it is suitable to determine the number of the signal electrodes simultaneously selected in accordance with uses when necessary.

Seventh Embodiment

Next, the seventh embodiment of the present invention will be explained with reference to FIG. 13 to FIG. 16.

Figure 14:
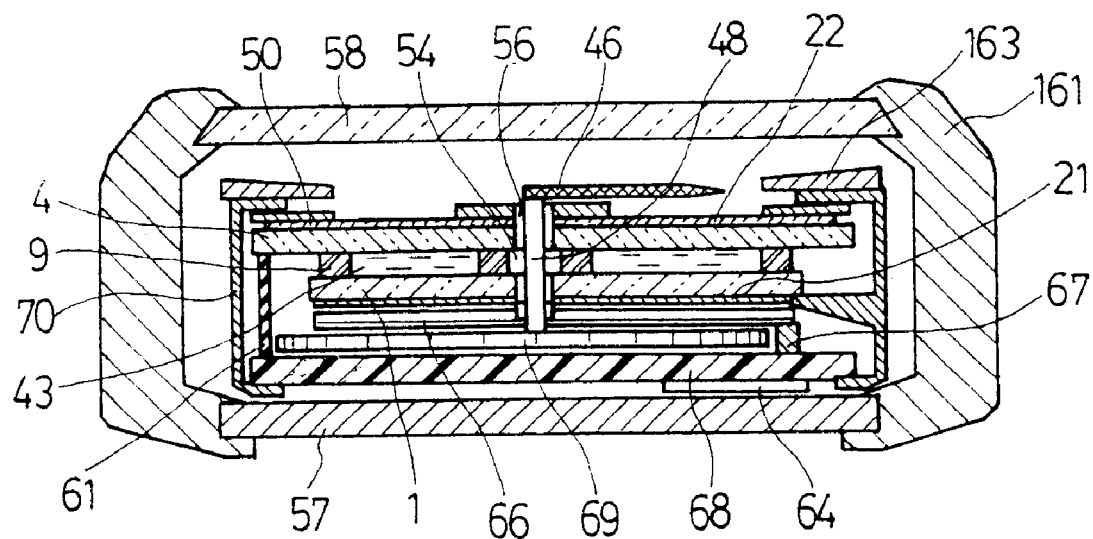
FIG. 14 is a sectional view along a line 14—14 in FIG. 13.
Figure 13:
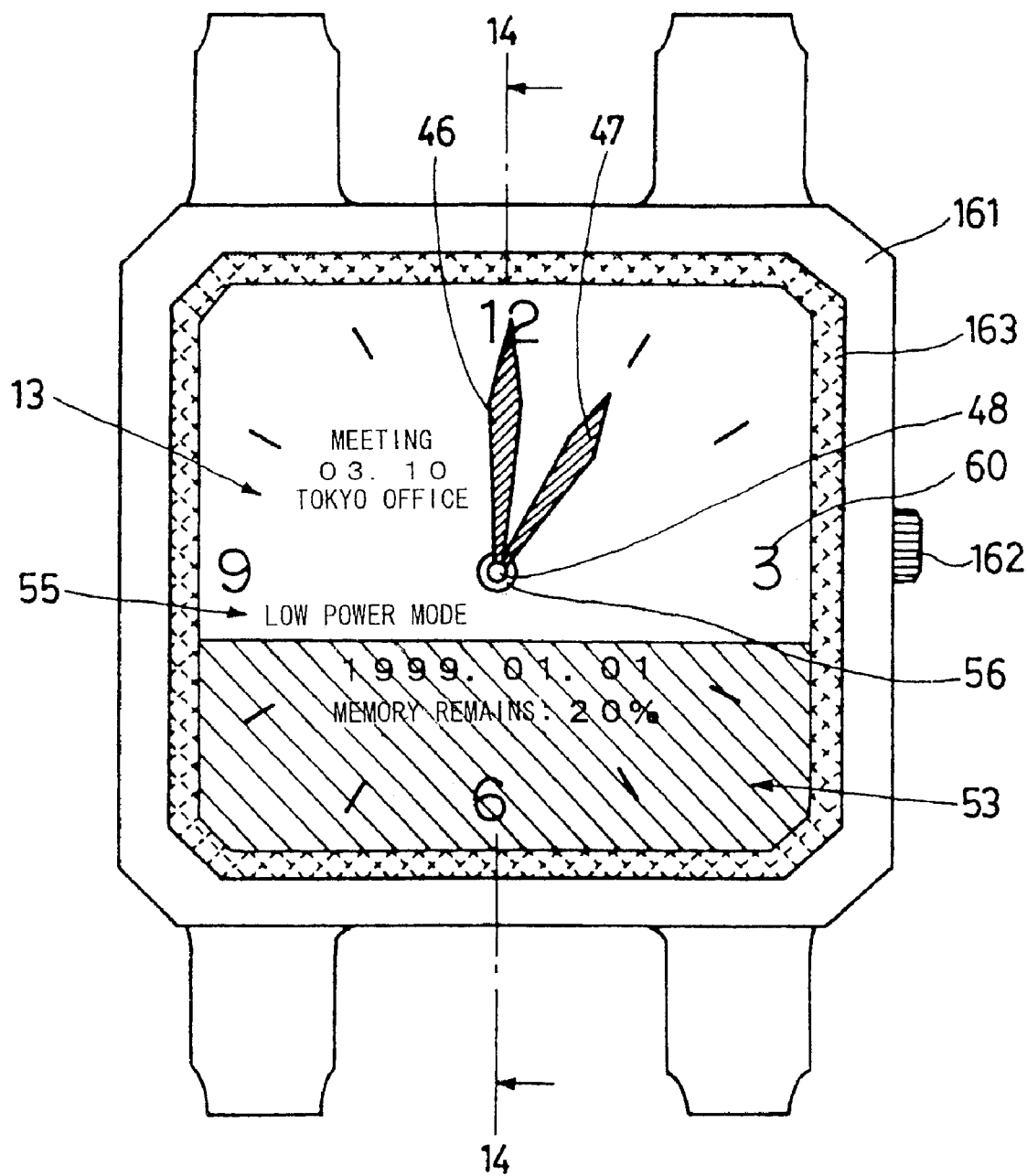
FIG. 13 is a planar schematic view of a timepiece including a liquid crystal display panel to which a seventh embodiment of the present invention is applied.
Figure 15:
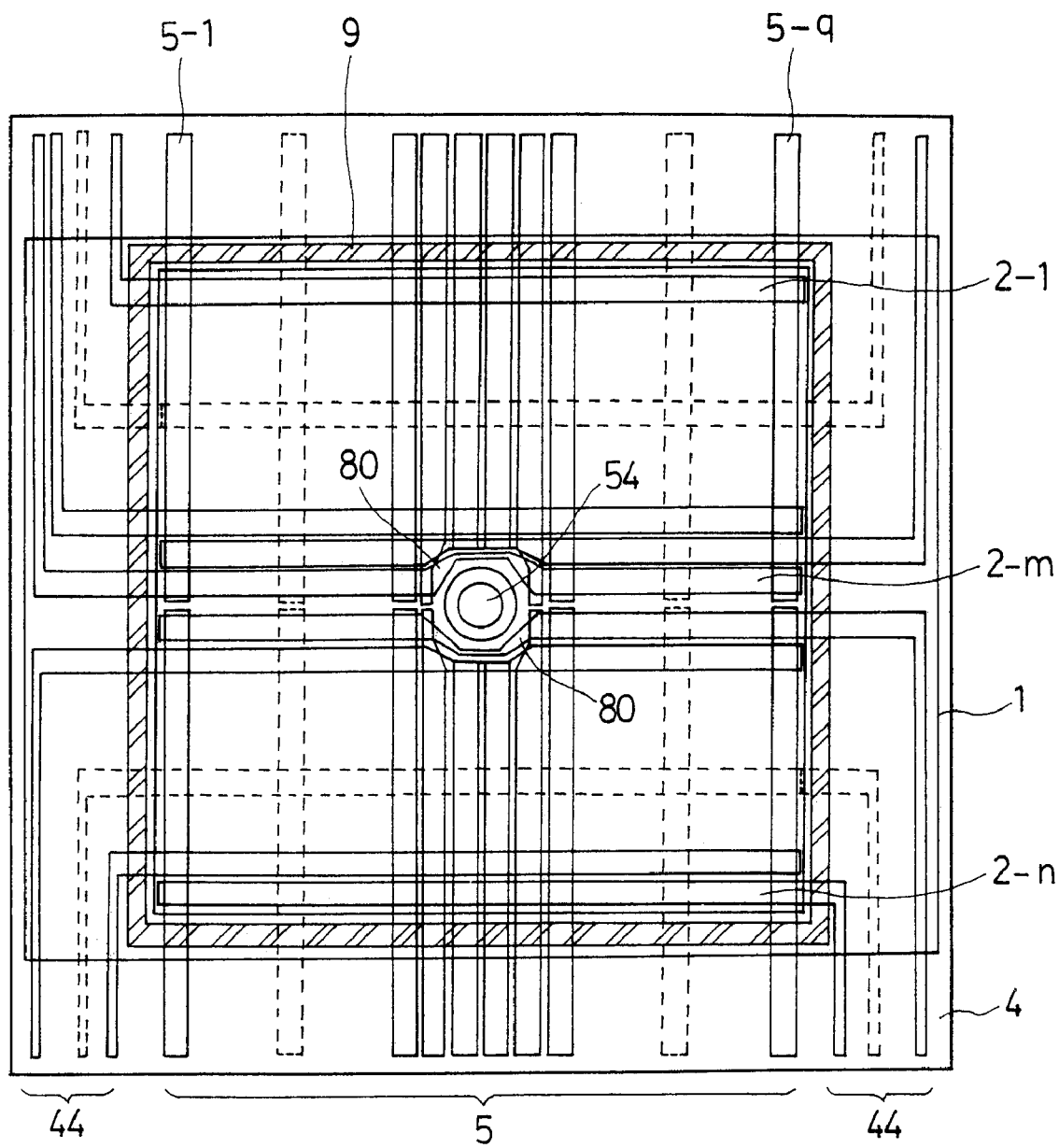
FIG. 15 is a plan view showing a liquid crystal display panel used in the timepiece shown in FIG. 12.
Figure 16:
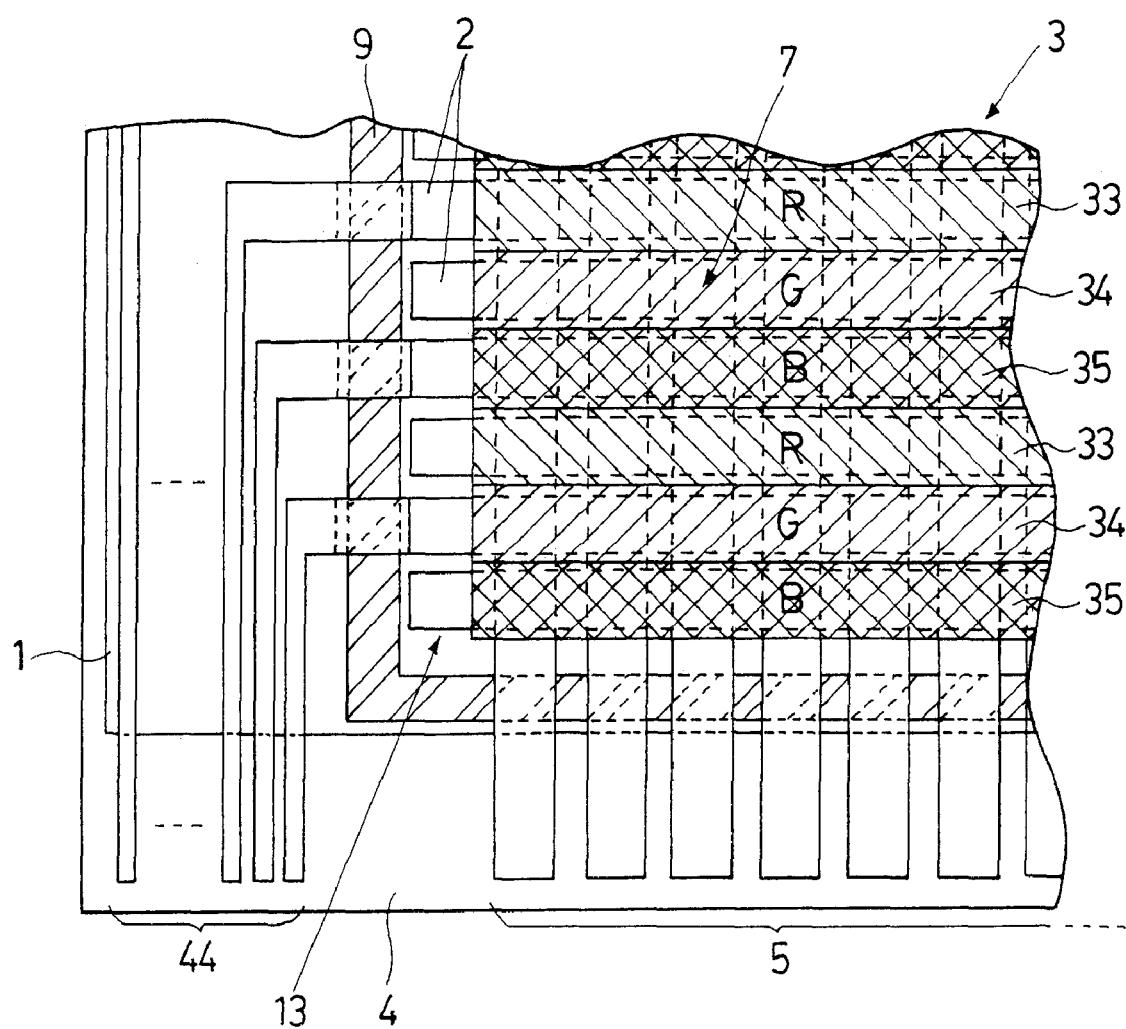
FIG. 16 is a partially enlarged view of the above liquid crystal display panel.

FIG. 13 is a planar schematic view of a timepiece including a liquid crystal display panel to which the seventh embodiment of the present invention is applied. FIG. 14 is a sectional view of the timepiece along a line 14—14. FIG. 15 is a plan view showing the liquid crystal display panel used in the timepiece. FIG. 16 is a partially enlarged view of FIG. 15.

The timepiece including the liquid crystal display panel to which the seventh embodiment is applied will be explained first.

This timepiece is, as shown in FIG. 13, an analog timepiece for displaying the time with a minute hand 46, an hour hand 47 and hour numbers 60, and has a liquid crystal display panel including a display region 13 over an entire region inside a panel cover 163, so that various kinds of information can be displayed on the liquid crystal display panel. Further, the timepiece has an adjusting button 162 for turning ON/OFF a display of the liquid crystal display panel, changing the display contents, correcting the time, and turning on a light source.

FIG. 13 shows the state in which the upper side of the display region 13 of the timepiece is made a full color display region for performing a full color display in 512 colors, while a low power display region 53 on the lower side is operated in a low power mode to perform a monochrome display, thereby reducing the electric power consumed by the liquid crystal display device. A low power mode display 55 showing this state is further displayed.

The liquid crystal display panel in this timepiece is constituted by providing, from the opposite side to a cover glass 58 (the back side) as shown in FIG. 14, a first substrate 1 and a second substrate 4 which is opposed to the first substrate 1 with a predetermined gap interposed therebetween. Signal electrodes, opposed electrodes, color filters and the like are omitted in FIG. 14, and thus they are described later.

A liquid crystal layer 43 is provided between the first substrate 1 and the second substrate 4, and the liquid crystal layer 43 is sealed with a sealing material 9 and a not shown closing material. Further, alignment films (not shown) made of a polyimide resin are provided on the first substrate 1 and the second substrate 4 respectively to align the liquid crystal layer 43 in predetermined directions. In this embodiment, a twisted nematic liquid crystal is used as the liquid crystal layer 43, and is aligned in a direction of 7:30 on the first substrate 1 and in a direction of 4:30 on the second substrate 4, thereby making a twist angle of the liquid crystal layer 43 to be 90°. However, what is used as the liquid crystal layer 43 is not limited to the twisted nematic liquid crystal, but another liquid crystal, for example, a guest host-type liquid crystal, a scattering-type liquid crystal, a selective reflection-type liquid crystal or the like may be applicable.

A first polarizing film 21 composed of RDF (trade name) manufactured by 3M Ltd. is provided on the first substrate 1 as a reflection-type polarizing film. A second polarizing film 22 composed of an absorption-type polarizing film in which pigment is stretched in one direction is provided on the second substrate 4. The first polarizing film 21 and the second polarizing film 22 are arranged so that transmission axes thereof are perpendicular to each other to be brought into a state of exhibiting strong reflection characteristics when a voltage applied to the liquid crystal layer 43 is large, and exhibiting transmission characteristics when the applied voltage is small by combination with the liquid crystal display panel. This constitutes the liquid crystal display panel.

Further, in this timepiece, a light source 66 is disposed on the back side of the liquid crystal display panel to allow the timepiece to be usable in a dark environment, and a circuit board 68 is disposed on the back side of the light source 66 as shown in FIG. 14. The liquid crystal display panel is connected to the circuit board 68 with a zebra-rubber connector 61, and the light source 66 is connected to the circuit board 68 through a light source terminal 67. The zebra-rubber connector is used as the light source terminal 67, but a spring may be used.

A battery 64 is fixed to the circuit board 68. This battery 64 is an energy source of this timepiece. A driver 69 having a hand shaft 48 linked to the minute hand 46 and the hour hand 47 is disposed between the light source 66 and the circuit board 68. The hand shaft 48 projects from the driver 69 through a hand shaft hole 56 including an opening portion 54 of the liquid crystal display panel into the cover glass 58 side.

Further, a printing layer 50 having a shielding effect is provided and the hour characters 60 are formed on the cover glass 58 side of the first polarizing film 21. Furthermore, a module frame 70 has the panel cover 163. The timepiece module structured as above is installed within a case 161, the cover glass 58 and a case back 57, thereby constituting the timepiece to which this embodiment is applied.

Next, the structure of the liquid crystal display panel will be explained in more detail. As shown in FIG. 15 and FIG. 16, signal electrodes 2 composed of a transparent conductive film are provided on the first substrate 1 composed of a transparent substrate. The signal electrodes 2 are in a column electrode pattern in which a first signal electrode 2-1 to an n-th signal electrode 2-n are in the form of almost parallel stripes except for a detouring portion 80 around the opening portion 54 in the display region 13. The signal electrode around the opening portion 54, as represented by an m-th signal electrode 2-m, is formed therein with the signal electrode detouring portion 80 which is thinner in width than that of the signal electrode 2 in the stripe form so as to detour the opening portion.

Further, data electrodes 5 composed of a transparent conductive film are provided on the second substrate 4 which is opposed to the first substrate 1 with a predetermined gap interposed therebetween. The data electrodes 5 are in a row electrode pattern in which a first data electrode 5-1 to a q-th data electrode 5-q are in the form of stripes in the display region 13. As the data electrode 5 in one row, two electrodes are formed from the top and the bottom with ends at the center respectively. The data electrode 5 in the vicinity of the opening portion 54 has a length shorter than that of the other data electrodes 5 and has a shape which ends in the vicinity of the opening portion 54 due to the outline of the liquid crystal display panel.

The signal electrodes 2 provided on the first substrate 1 are connected to connecting electrodes 44 on the second substrate 4 by forming the sealing material 9 out of an anisotropic conductive sealing material, which is provided around the display region and used for sealing the liquid crystal layer 43. The connecting electrodes 44 are alternately formed on the right and the left at every other electrode. The anisotropic conductive sealing material, in which conductive particles (not shown) are mixed in an insulating resin, can connect the signal electrode 2 to the connecting electrode 44 through the conductive particles. The same numbers of the connecting electrodes 44 are led to this side and the backside of the display region 13 in the drawing to enable the connection to the circuit board. This is an effective structure when the number of pixel portions is small because its display region can occupy a large area with respect to the outline of the substrate.

As shown in FIG. 16, red (R) color filters 33, green (G) color filters 34 and blue (B) color filters 35 are provided on the second substrate 4. Each color filter is in stripe form. In this liquid crystal display device, the color filters 33, 34 and 35 are in the form of stripes parallel to the signal electrodes 2. Thus, a sharp display can be attained when using a color reducing display pattern signal, a limited color display pattern signal, or a reduced color display pattern signal.

It should be noted that the color filters 3 may be composed of three colors of cyan (C), magenta (M) and yellow (Y), or may be color filters in the form of dots.

The data electrodes 5 are provided on the color filters 33, 34 and 35 through an interlayer insulation film (not shown) made of an acrylic resin. As shown in FIG. 16, a portion where the signal electrode 2 and the data electrode 5 overlap one another forms a pixel portion 7, and a region where a plurality of the pixel portions 7 are arranged in a matrix form is the display region 13.

The display control of the timepiece including the liquid crystal display panel as described above is conducted by driving it by the driving signals explained in the first to fifth embodiments and switching when necessary between the full color display and the display by low power consumption of the color reducing display, the limited color display or the reduced color display, thereby reducing the power consumption and performing the dot matrix-type color display in the timepiece.

Eighth Embodiment

Next, the eighth embodiment of the present invention will be explained with reference to FIG. 17 to FIG. 21.

Figure 17:
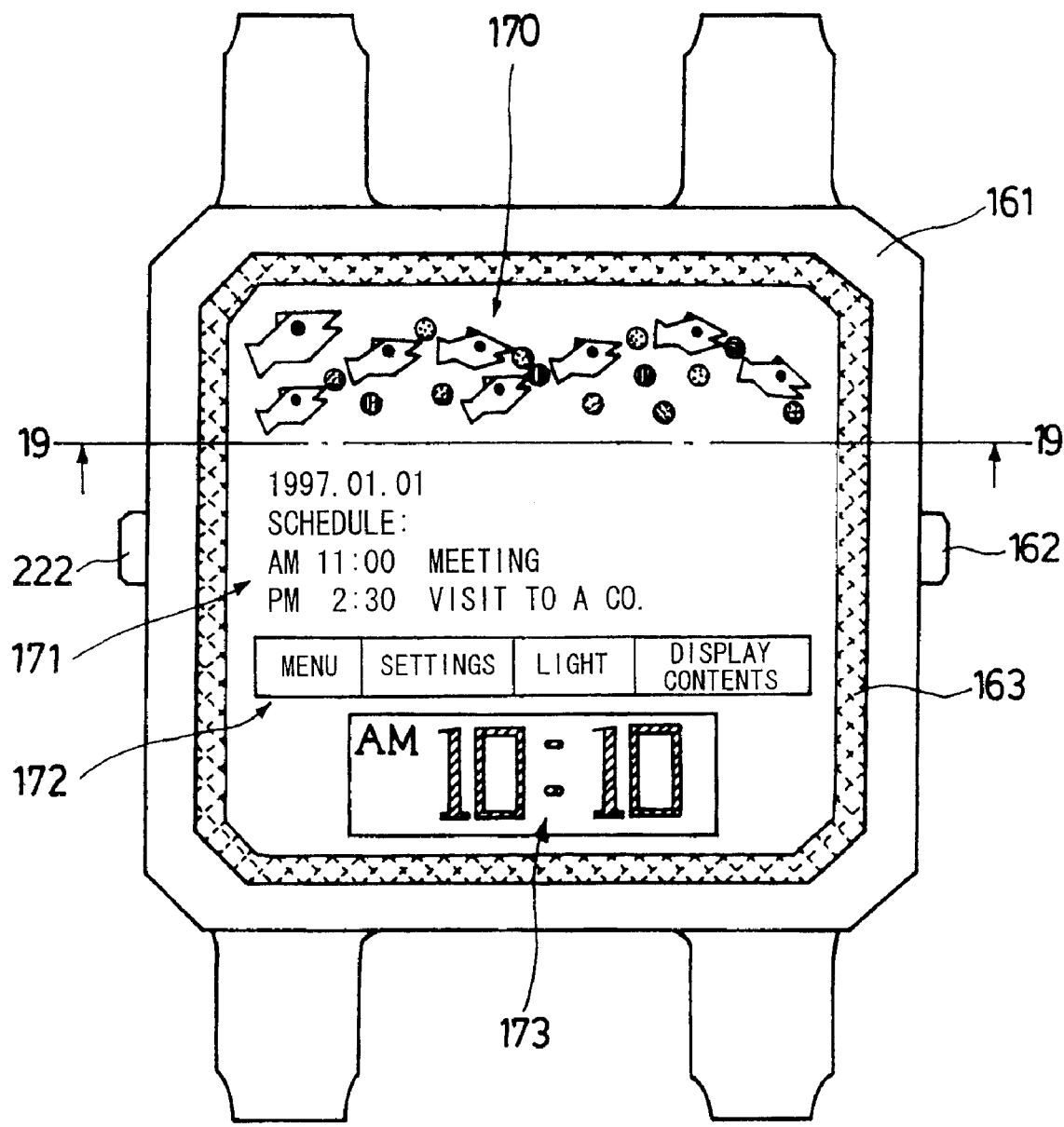
FIG. 17 is a planar schematic view of a timepiece including a liquid crystal display panel to which an eighth embodiment of the present invention is applied.
Figure 18:
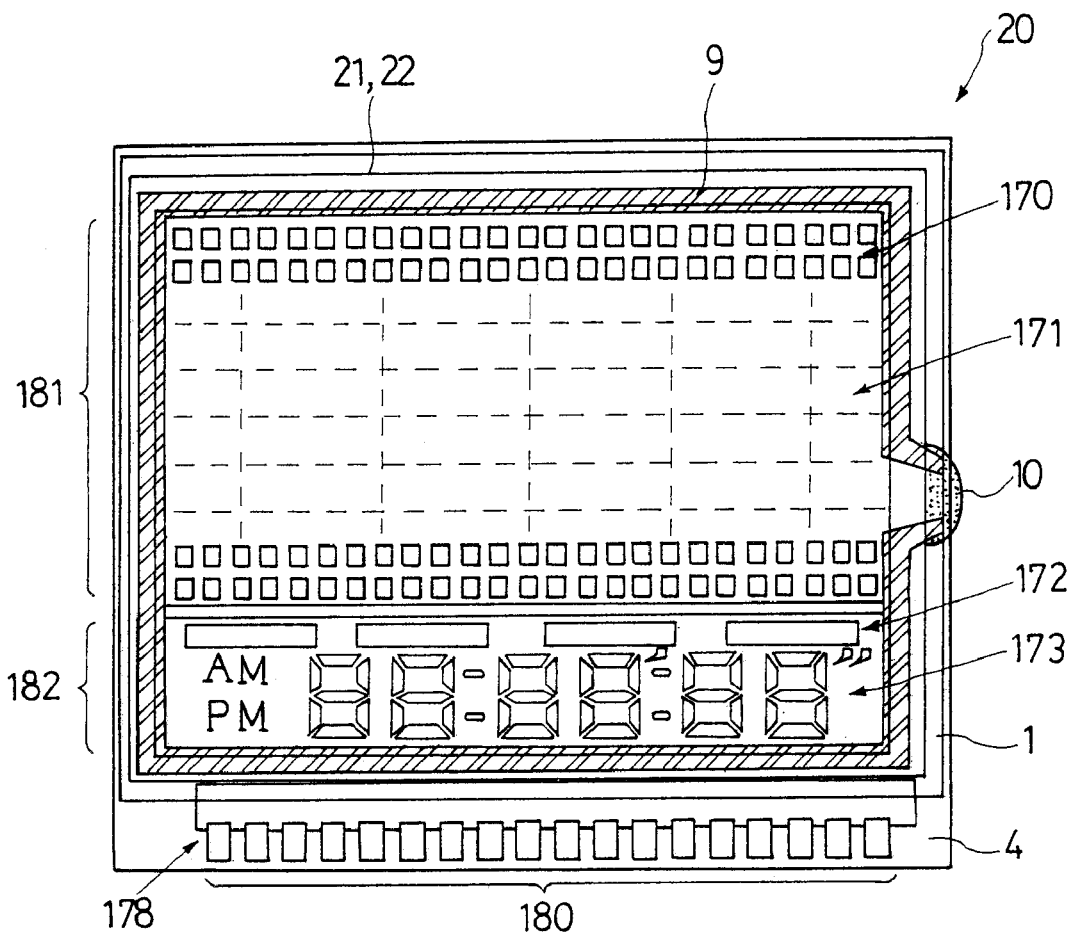
FIG. 18 is a plan view showing a liquid crystal display panel used in the timepiece shown in FIG. 17.
Figure 19:
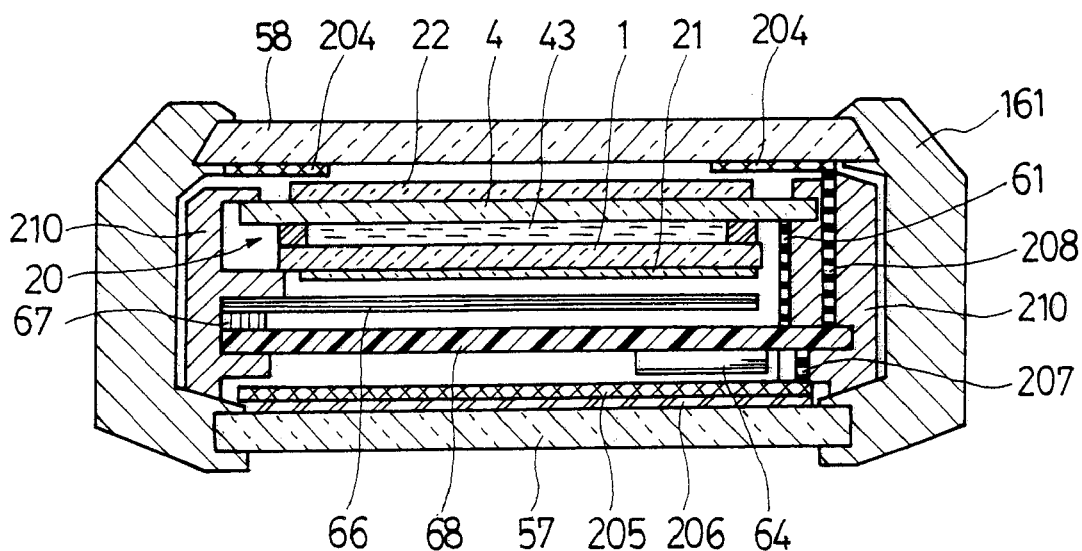
FIG. 19 is a sectional view along a line 19—19 in FIG. 17.
Figure 20:
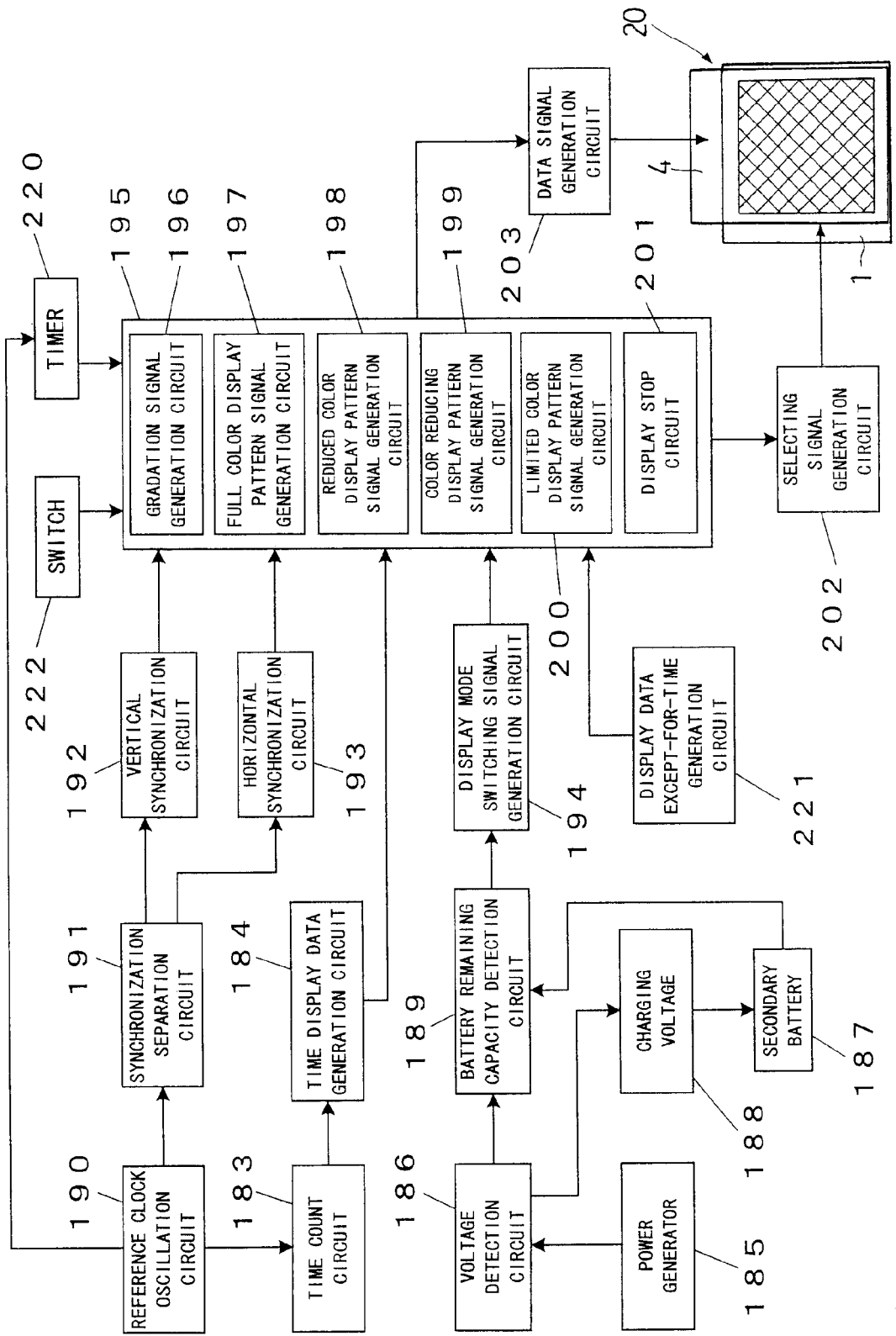
FIG. 20 is a block diagram showing circuits for reducing the power consumption of the timepiece shown in FIG. 17.
Figure 21:
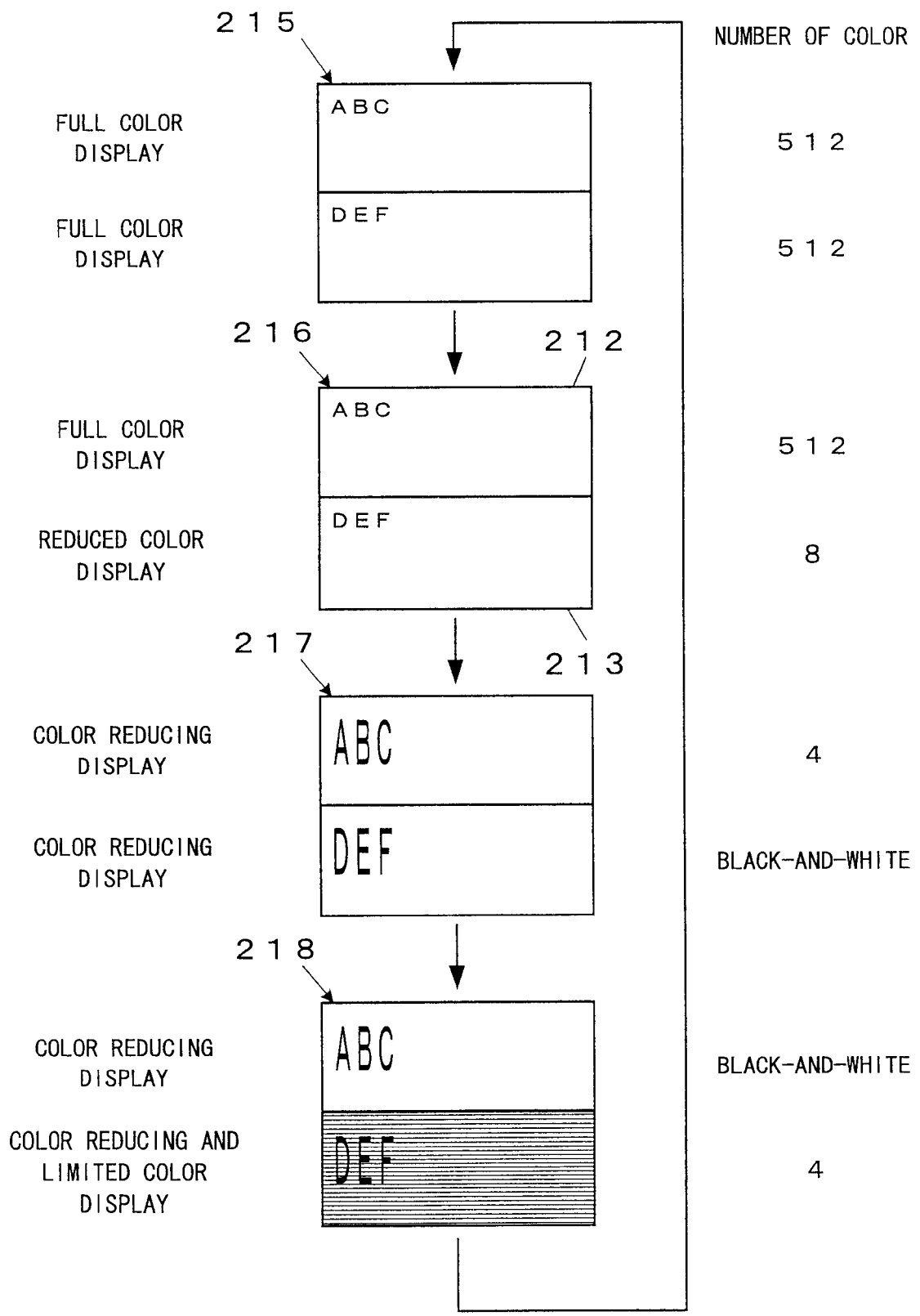
FIG. 21 is a view showing an example of control of reducing power consumption conducted with a dot matrix display portion of the timepiece shown in FIG. 17 vertically divided.

FIG. 17 is a planar schematic view of a timepiece having a liquid crystal display panel to which the eighth embodiment of the present invention is applied. FIG. 18 is a plan view showing the liquid crystal display panel used in the timepiece. FIG. 19 is a sectional view of the timepiece along a line 19—19. FIG. 20 is a block diagram showing circuits for reducing the power consumption of the timepiece. FIG. 21 is a view showing examples of the control of reducing power consumption conducted with a dot matrix display portion of the timepiece divided into the top and the bottom.

The timepiece including the liquid crystal display panel to which the eighth embodiment applies will be explained first.

This timepiece, as shown in FIG. 17, is a timepiece for showing the time in a digital display on a time display portion 173, and further includes a character display portion 170, a schedule display portion 171 and a menu display portion 172, and thus it is a timepiece capable of displaying various information in addition to the time. Further, this timepiece includes an adjusting button 162 for changing the display contents and a switch 222 for switching its display mode.

A liquid crystal display panel 20 provided in this timepiece is provided with a first substrate 1 and signal electrodes in order from the opposite side to a cover glass 58 (the back side). Two types of signal electrodes are provided, which are in the form of stripes and in the form of segments. Red (R) color filters, green (G) color filters and blue (B) color filters are provided on the second substrate 4 which is opposed to the first substrate 1 with a predetermined gap interposed therebetween. In this liquid crystal display device 20, the color filters are in the form of stripes parallel to the data electrodes. More specifically, the color filters are provided in the region where they overlap the data electrodes in the form of stripes described later, and not in a portion over the data electrodes in the form of segments. By virtue of the form of stripes parallel to the data electrodes, a sharp display can be attained when using a color reducing display pattern signal, a limited color display pattern signal, or a reduced color display pattern signal.

It should be noted that the color filters may be composed of three color filters of cyan (C), magenta (M) and yellow (Y), or may be color filters in the form of dots.

An interlayer insulation film made of an acrylic resin is provided on the color filter. The data electrodes in the form of stripes and the data electrodes in the form of segments are provided on the interlayer insulation film. A portion where the signal electrode and the data electrode overlap one another forms a pixel portion. A region where a plurality of the signal electrodes in the form of stripes overlap the data electrodes is a dot matrix display region 181 shown in FIG. 18, and a region where the signal electrodes in the form of segments overlap the data electrodes is a segment display region 182.

The dot matrix display region 181 shown in FIG. 18 constitutes the character display portion 170 and the schedule display portion 171. The character display portion 170 and the schedule display portion 171 are not necessarily in the positional relation like this, but are set in any positions in the dot matrix display portion 181 when necessary.

The segment display region 182 constitutes the menu display portion 172 and the time display portion 173. The time and the menu are made the segment type and the display region with much information is made the matrix type, thereby reducing the power consumption. It should be noted that no color filter is provided over the time display portion 173, giving a priority to brightness and a reduction in power consumption, providing a monochrome display. Further, a full color display, a reduced color display, a color reducing display, and a limited color display which include gradation signals are used in the dot matrix display portion 181, thereby enabling various types of displays from a display of high quality to one in the low power mode.

As shown in FIG. 19, a liquid crystal layer 43 is provided between a first substrate 1 and a second substrate 4, and the liquid crystal layer 43 is sealed with a sealing material 9 and a closing material 10. Further, alignment films (not shown) made of a polyimide resin are provided on faces on the liquid crystal layer 43 side of the first substrate 1 and the second substrate 4 to align the liquid crystal layer 43 in predetermined directions. When a super twisted nematic (STN) liquid crystal is used as the liquid crystal layer 43, any twist angle ranging from 210 degrees to 260 degrees is employed as the twist angle of the liquid crystal layer 43. However, another liquid crystal, for example, a guest host-type liquid crystal, a scattering-type liquid crystal, a selective reflection-type liquid crystal or the like may be used for the liquid crystal layer 43.

A first polarizing film 21 composed of RDF (trade name) manufactured by 3M Ltd. is provided on the face opposite to the liquid crystal layer 43 of the first substrate 1 as a reflection-type polarizing film. A second polarizing film 22 composed of an absorption-type polarizing film in which pigment is stretched in one direction is provided on the face opposite to the liquid crystal layer of the second substrate 4. The first polarizing film 21 and the second polarizing film 22 are arranged so that transmission axes thereof are parallel to each other to be brought into a state of exhibiting strong reflection characteristics when a voltage applied to the liquid crystal layer 43 is small, and exhibiting transmission characteristics when the applied voltage is large by combination with the liquid crystal display panel 20. This constitutes the liquid crystal display panel 20.

A light source 66 is disposed on the back side of the liquid crystal display panel 20 to allow the timepiece to be usable in a dark environment, and a circuit board 68 is disposed on the back side of the light source. A battery 64 is fixed to the circuit board 68. On the opposite side to the visible side of the second substrate 4, an LCD controller and driver IC (integrated circuit) 178 for applying predetermined signals to the signal electrodes and data electrodes is implemented by a chip-on-glass mounting method (a face down bonding method) as shown in FIG. 18. The signal electrodes and data electrodes of the dot matrix display portion 181 and the segment display portion 182 are connected to the LCD controller and driver IC 178 via connecting electrodes including signal electrode connecting electrodes though the illustration thereof is omitted, so that they are driven by applied voltage (signal) supplied from the LCD controller and driver IC 178.

In order to allow the number of ICs mounted to be one, signal electrodes 175 in the form of stripes are electrically arrangement-changed to the signal electrode connecting electrodes which are provided on the second substrate 4 using an anisotropic conductive adhesive in which conductive particles are dispersed in the sealing material 9. The signal electrodes in the form of segments are also arrangement-changed onto the second substrate 4 similarly using the anisotropic conductive adhesive.

External signals are inputted into the LCD controller and driver IC 178 via input electrodes 180 which are provided on the second substrate 4, and a zebra rubber connector 61 connects the circuit board 68 and the input electrodes 180.

A liquid crystal module composed of the liquid crystal display panel 20 with the LCD controller and driver IC 178 mounted, the circuit board 68, the light source 66 and a holding frame 210 is set in a watch case 161, constituting a timepiece. A panel cover 163 is provided in the timepiece to shield a part of the liquid crystal module which is unnecessary to be seen, thereby preventing the unnecessary part from being watched by a user of the timepiece.

Further, a power generating function is provided to the timepiece to enable the timepiece to be used for a long time without replacement of the battery 64. In this timepiece, a case back 57 is made of a material transmitting light, and a solar cell 205 is provided as a power generator inside the case back 57 through an ultraviolet cut film 206. Further, the panel cover is a solar cell 204. The solar cells 204 and 205 are connected to the circuit board 68 via connecting wires 208 and 207 respectively.

The battery 64 is charged by the solar cell 204 which is the panel cover in a normal use condition of the timepiece, and it is charged by the solar cell 205 which is provided on the case back 57 when the timepiece is not carried. The solar cells are arranged as above, thereby obtaining a sufficient quantity of power generation while keeping the display region of the liquid crystal display panel 20 wide.

In addition to the solar cell, a mechanism for converting the kinetic energy into the electric energy, a mechanism for converting the heat energy to the electric energy or the like may be used as the power generator.

Next, the configuration of circuits which realizes the low power display of this timepiece will be explained.

As shown in FIG. 20, the power generating states of the solar cells 204 and 205 which are power generators 185 are detected by a voltage detection circuit 186. The generated energy by the solar cells is sent from the voltage detection circuit 186 through a charging voltage conversion circuit 188 and accumulated in a secondary battery 187. A battery remaining capacity detection circuit 189 detects the states of the voltage detection circuit 186 and the secondary battery 187 and sends them out to a display mode switching signal generation circuit 194.

The display mode switching signal generation circuit 194 sends out a signal for selecting a gradation signal generation circuit 196, a full color display pattern signal generation circuit 197, a reduced color display pattern signal generation circuit 198, a color reducing display pattern signal generation circuit 199, a limited color display pattern signal generation circuit 200 and a display stop circuit 201 included in a plural simultaneous selection circuit block 195 in accordance with information from the battery remaining capacity detection circuit 189, that is, the battery remaining capacity and the quantity of power generation.

The full color display pattern signal generation circuit 197, the reduced color display pattern signal generation circuit 198, the color reducing display pattern signal generation circuit 199, and the limited color display pattern signal generation circuit 200 are circuits for generating the full color display pattern signal, the reduced color display pattern signal, the color reducing display pattern signal, and the limited color display pattern signal respectively which are explained in the above embodiments. It is possible to simultaneously select a plurality of the circuits 198 to 200 to generate a display signal having characteristics of a plurality of display pattern signals. The display stop circuit 201 is a circuit for stopping the display of the dot matrix display portion 181.

The gradation signal generation circuit 196 is a circuit for giving a gradation to the signal generated by each of the circuits 197 to 200, and is selected separately from the circuits 197 to 201. When the gradation signal generation circuit 196 is not selected, the gradation display is not performed, but the power consumption can be reduced.

The display mode switching signal generation circuit 194 selects a circuit which performs a display requiring less power consumption when the remaining capacity of the battery is in decreased state, and selects the display stop circuit 201 when the quantity decreases to less than a certain limit to stop the display of the dot matrix display portion 181. However, what are selected in the plural simultaneous selection circuit block 195 are only the circuits for the display of the dot matrix display portion 181, and the display of the segment display portion 182 is always performed constant regardless of the selection.

In this embodiment, the dot matrix display portion 181 is controlled divided into an upper display region 212 and a lower display region 213 as shown in FIG. 21, and thus circuits are separately selected for these. However, the entire dot matrix display portion 181 may be controlled as one display region.

In order to successively apply signals to the signal electrodes or the data electrodes of the liquid crystal display panel 20 constituting the timepiece, a signal generated by a reference clock oscillation circuit 190 is divided to a vertical synchronizing circuit 192 and a horizontal synchronizing circuit 193 through a synchronization separation circuit 191.

In the plural simultaneous selection circuit block 195, data to be sent out to a selection signal generation circuit 202 and a data signal generation circuit 203 is generated based on data from a display data generation circuit described later and output signals by the vertical synchronizing circuit 192 and the horizontal synchronizing circuit 193. Then, a selection signal generated in the selection signal generation circuit 202 and a data signal generated in the data signal generation circuit 203 based on the data are applied to the liquid crystal display panel 20.

The display data except for the time is generated by a display data except-for-time generation circuit 221 and inputted into the plural simultaneous selection circuit block 195.

As for the time display data, time is measured in a time count circuit 183 by an output clock of the reference clock oscillation circuit 190, and time display data is generated in a time display data generation circuit 184 based on the time measured in the time count circuit 183, and inputted into the plural simultaneous selection circuit block 195.

The display method of the dot matrix display portion 181 may be selected with a switch 222. In this case, the information of the switch 222 being pushed is transmitted to the plural simultaneous selection circuit block 195, and circuits are selected in accordance with the information.

Further, the display method of the dot matrix display portion 181 can be changed after every lapse of fixed time. In this case, a timer 220 for measuring time by the output clock of the reference clock oscillation circuit 190 sends out a signal to the plural simultaneous selection circuit block 195 at a previously determined point of time, and circuits are selected in accordance with the signal.

The low power display is controlled with the dot matrix display portion 181 of this timepiece divided into two display regions as described above. An example of this control is explained below.

FIG. 21 shows display modes 215 to 218 for the dot matrix display portion 181. In 215, both the upper display region 212 and the lower display region 213 perform the full color display in 512 colors. In other words, this is a display by a maximum display ability of the liquid crystal display panel 20 of this timepiece with high power consumption of the liquid crystal display device.

In 216, the upper display region 212 performs the full color display, but the lower display region 213 performs the reduced color display in which the number of gradations is reduced using the reduced color display pattern signal to thereby reduce the number of colors to eight in order to reduce the power consumption.

In 217, the same color reducing display pattern signal is applied to every group of three signal electrodes and only the data electrode for one color out of three data electrodes for R, G, B in every group is used in the upper display region 212, thereby limiting the number of display colors to four. The same color reducing pattern signal is applied to every group of three signal electrodes and every group of three data electrodes, and further, gradation display is not performed, resulting in the black-and-white binary display in the lower display region 213, thereby efficiently reducing the power consumption. In this embodiment, the color filters are formed parallel to the data electrodes, and thus when the color reducing display pattern signal is used which simultaneously selects a plurality of the signal electrodes, the display is vertically stretched as compared with that of the full color display.

In 218, the same color reducing pattern signal is applied to every group of three signal electrodes and every group of three data electrodes, and further, gradation display is not performed, resulting in the black-and-white binary display gradation display in the upper display region 212 to thereby efficiently reduce the power consumption, and the limited color display pattern signal for driving two signal electrodes and stopping one is applied in the lower display region 213. Further, the color reducing display pattern signal is integrally used to thereby increase the size of a character, thereby decreasing influence which is exerted upon the visibility due to the stop of driving of the signal electrodes.

The power consumption is reduced from 215 to 216, 217, 218 when it can not be expected to obtain an electric power enough for driving because of a decrease in the remaining capacity of the secondary battery 187 which is an energy source of the liquid crystal display device or a decrease in the quantity of power generation by the solar cell 204 which is the power generator 185, when a user of the timepiece pushes the switch 222, or when a previously set time is elapsed.

When the remaining capacity of the secondary battery 187 recovers or the quantity of power generation by the solar cell 204 recovers to secure sufficient electric power, or when the user of the timepiece operates it, the display is returned to 215, releasing the reduction in power consumption.

The example shown here is just an example of the control of reducing the power consumption, and the order or the combination of display pattern signals in use is not limited to this.

The example in which the dot matrix display portion 181 is always controlled with divided into the upper display portion 212 and the lower display portion 213 is shown here, but it is also suitable to control it shifting its boundary line or dividing it into three or more regions in accordance with the circumstances.

Further, the example in which the liquid crystal display panel 20 provided with the color filters which are parallel to the data electrodes 5 is described here, and the same control can also apply to one provided with the color filters which are parallel to the signal electrodes 2.

According to the method capable of driving the liquid crystal display panel in the low power mode as described above, the power consumption can be reduced and the dot matrix type color display can be performed in the timepiece. Further, the employment of the low power mode enables a function as a timepiece to be maintained with a power generating mechanism in a size installable in the timepiece. Furthermore, the low power mode of the liquid crystal display panel is switched in accordance with the remaining capacity of the battery, making it possible to increase the battery life. Two types of power generating mechanisms are employed to switch between the method of charging during the wearing of the timepiece and that during the non-wearing of it, thereby enabling the charge without decreasing the display quality of the liquid crystal display panel.

Further, the use of a signal having characteristics of two or more out of the reduced color display pattern signal, the color reducing display pattern signal and the limited color display pattern signal can further reduce the power consumption.

Incidentally, this embodiment describes the timepiece including the liquid crystal display panel, but it is, of course, possible to drive a liquid crystal display panel of another liquid crystal display device using the same control circuit.

Industrial Applicability

As has been described, according to a method of driving a liquid crystal display panel of the present invention, a color reducing display is performed using a color reducing display pattern signal of simultaneously selecting a plurality of signal electrodes, thereby making it possible to increase the period of time in which the signal electrodes are selected as compared with that of a color display pattern signal. In other words, the frequencies of selection signal and data signal can be decreased.

Further, as a liquid crystal layer electro-optically changes by an effective voltage which is applied thereto during a fixed period, a plurality of the signal electrodes are simultaneously selected to reduce the number of time sharing, making it possible to reduce the voltages of the selection signal and the data signal according to a voltage averaging method. The reduction in the frequency and the reduction in the voltage enable reduction in the electric power consumed by the liquid crystal display device in both its driving circuit and liquid crystal layer. Additionally, the selection of the plurality of the selection signals results in the simultaneous selection of a plurality of color filters, enabling a bright display.

It is extremely effective to apply this color reducing display to a liquid crystal display device having color filters in the form of stripes parallel to the data electrodes, thereby reducing the power consumption while maintaining a display in the same number of colors as that of the color display pattern signal.

Further, a limited color display is performed using a limited color display pattern signal of selecting only part of the signal electrodes, also making it possible to increase the period of time in which the signal electrodes are selected as compared with the color display pattern signal and to decrease the frequencies of the selection signal and the data signal. Furthermore, the signal electrodes to be selected are changed in accordance with circumstances or objects to thereby change colors in this case, enabling realization of both securement of visibility and low power consumption.

Further, a reduced color display is performed using a reduced color display pattern signal in which the number of gradations of the data signal is reduced than that in the case of a full color display, thereby simplifying the driving of the driving circuit of the data signal, enabling low power consumption.

Moreover, further reduction in power consumption can be achieved by performing a display using a signal having combined characteristics of these signals.

The display of the liquid crystal display panel is switched into a display by low power in accordance with the remaining capacity of the battery, the quantity of power generation or the operation by a user, thereby realizing low power consumption while suppressing the decrease in the display quality to the minimum, and increasing battery life when it is driven by a battery. The effects are further prominent when a display region of the liquid crystal display panel is divided into a plurality of regions and they are controlled individually.

Accordingly, the method of the present invention applies to display control of a timepiece, thereby enabling a color display by the liquid crystal display panel also in the timepiece to which reduction in power consumption is strongly required from the viewpoints of shape and size.

The present invention can be applied not only to the timepiece, but also to liquid crystal display panels of electronic devices such as a personal digital assistants, a portable information terminal, a cellular phone, a mobile game machine and the like, thereby reducing the power consumption of these electronic devices to provide electronic devices friendly to the earth environment.

What is claimed is:

1. A method of driving a color liquid crystal display panel including: a transparent first substrate formed with a plurality of signal electrodes and a transparent second substrate formed with a plurality of data electrodes arranged so that a face formed with said signal electrodes and a face formed with said data electrodes are opposed to each other; a liquid crystal layer sealed in a gap therebetween; pixel portions respectively constituted at portions where said signal electrodes cross over and planarly overlap said data electrodes; and color filters, in which filters of three primary colors are alternately arranged at least at positions corresponding to said pixel portions, provided on said first substrate or on said second substrate, in which a display is performed by selectively applying a voltage between said signal electrodes and said opposed data electrodes to thereby change optical characteristics of said liquid crystal layer between said signal electrode and said opposed electrode at said pixel portion, wherein a normal color display of applying selection signals to said plurality of signal electrodes constituting all said pixel portions of said color liquid crystal display panel in a time division manner, and applying data signals to said data electrodes in correspondence to the selection signals applied to said signal electrodes to allow said color filters of said pixel portions to be individually selected; and a color reducing display of applying selection signals in such a manner to simultaneously select a plurality of said signal electrodes to simultaneously select said filters of a plurality of the colors arranged at positions corresponding to said plurality of signal electrodes; are selectively performed.

2. The method of driving a color liquid crystal display panel according to claim 1, wherein said driven color liquid crystal display panel is a color liquid crystal display panel including color filters, in which filters of three primary colors in the form of stripes are alternately arranged to be parallel to and planarly overlap said signal electrodes, provided on said first substrate or on said second substrate, and selection signals are applied to simultaneously select a plurality of said signal electrodes in said color reducing display to simultaneously select said filters of a plurality of the colors in the form of stripes arranged to planarly overlap said plurality of signal electrodes respectively.

3. The method of driving a color liquid crystal display panel according to claim 1, wherein said normal color display and other display are switched according to time.

4. The method of driving a color liquid crystal display panel according to claim 1, wherein said normal color display and other display are individually performed with a display region constituted by said all pixel portions of said color liquid crystal display panel divided into a plurality of display regions.

5. The method of driving a color liquid crystal display panel according to claim 1, wherein said normal color display and other display are switched according to a remaining capacity of a battery so that said normal color display is performed when the remaining capacity of the battery is larger than a predetermined capacity, and said other display is performed when the remaining capacity is below the predetermined capacity, respectively.

6. A method of driving a color liquid crystal display panel including: a transparent first substrate formed with a plurality of signal electrodes and a transparent second substrate formed with a plurality of data electrodes arranged so that a face formed with said signal electrodes and a face formed with said data electrodes are opposed to each other; a liquid crystal layer sealed in a gap therebetween; pixel portions respectively constituted at portions where said signal electrodes cross over and planarly overlap said data electrodes; and color filters, in which filters of three primary colors are alternately arranged at least at positions corresponding to said pixel portions, provided on said first substrate or on said second substrate, in which a display is performed by selectively applying a voltage between said signal electrodes and said opposed electrodes to thereby change optical characteristics of said liquid crystal layer between said signal electrodes and said opposed electrode at said pixel portion, wherein a normal color display of applying selection signals to said plurality of signal electrodes constituting all said pixel portions of said color liquid crystal display panel in a time sharing manner, and applying data signals to said data electrodes in correspondence to the selection signals applied to said signal electrodes to allow said color filters of said pixel portions to be individually selected; and a limited color display of applying selection signals to part of said plurality of signal electrodes in a time sharing manner, and not applying selection signals to other signal electrodes to allow only said color filters arranged at positions corresponding to said signal electrodes to which the selection signals are applied to be selected; are selectively performed.

7. The method of driving a color liquid crystal display panel according to claim 6, wherein said driven color liquid crystal display panel is a color liquid crystal display panel including color filters, in which filters of three primary colors in the form of stripes are alternately arranged to be parallel to and planarly overlap said signal electrodes, provided on said first substrate or on said second substrate, and selection signals are applied to part of said plurality of signal electrodes in a time sharing manner, and no selection signal is applied to other signal electrodes in said limited color display to allow only said filters out of said color filters, in the form of stripes, arranged to planarly overlap said signal electrodes respectively to which the selection signals are applied to be selected.

8. A method of driving a color liquid crystal display panel including: a transparent first substrate formed with a plurality of signal electrodes and a transparent second substrate formed with a plurality of data electrodes arranged so that a face formed with said signal electrodes and a face formed with said data electrodes are opposed to each other; a liquid crystal layer sealed in a gap therebetween; pixel portions respectively constituted at portions where said signal electrodes cross over and planarly overlap said data electrodes; and color filters, in which filters of three primary colors in the form of stripes are alternately arranged to be parallel to and planarly overlap said data electrodes, provided on said first substrate or on said second substrate, in which a display is performed by selectively applying a voltage between said signal electrode and said opposed data electrodes to thereby change optical characteristics of said liquid crystal layer between said signal electrodes and said opposed data electrodes at said pixel portion, wherein a normal color display of applying selection signals to said plurality of signal electrodes constituting all said pixel portions of said color liquid crystal display panel in a time sharing manner, and applying data signals to said data electrodes in correspondence to the selection signals applied to said signal electrodes to allow said individual color filters of said pixel portions to be selected; and a color display of applying selection signals in such a manner to simultaneously select a plurality of said signal electrodes, and applying data signals to said plurality of data electrodes in a time sharing manner to allow said filters of a plurality of the colors in the form of stripes arranged to planarly overlap said plurality of data electrodes respectively to be individually selected and to reduce power consumption; are selectively performed.

9. A method of driving a color liquid crystal display panel including: a transparent first substrate formed with a plurality of signal electrodes and a transparent second substrate formed with a plurality of data electrodes arranged so that a face formed with said signal electrodes and a face formed with said data electrodes are opposed to each other; a liquid crystal layer sealed in a gap therebetween; pixel portions respectively constituted at portions where said signal electrodes cross over and planarly overlap said data electrodes; and color filters, in which filters of three primary colors in the form of stripes are alternately arranged to be parallel to and planarly overlap said data electrodes, provided on said first substrate or on said second substrate, in which a display is performed by selectively applying a voltage between said signal electrode and said opposed electrode to thereby change optical characteristics of said liquid crystal layer between said signal electrodes and said opposed data electrodes at said pixel portion, wherein a normal color display of applying selection signals to said plurality of signal electrodes constituting all said pixel portions of said color liquid crystal display panel in a time sharing manner, and applying data signals to said data electrodes in correspondence to the selection signals applied to said signal electrodes to allow said filters of three primary colors in the form of stripes to be individually selected; and a black-and-white display of applying selection signals in such a manner to simultaneously select a plurality of said signal electrodes, and simultaneously applying the same data signals to three of said data electrodes on which said filters of three primary colors in the form of stripes are arranged to simultaneously select said filters of three primary colors to reduce power consumption; are selectively performed.

10. A method of driving a color liquid crystal display panel including: a transparent first substrate formed with a plurality of signal electrodes and a transparent second substrate formed with a plurality of data electrodes arranged so that a face formed with said signal electrodes and a face formed with said data electrodes are opposed to each other; a liquid crystal layer sealed in a gap therebetween; pixel portions respectively constituted at portions where said signal electrodes cross over and planarly overlap said data electrodes; and color filters, in which filters of three primary colors are alternately arranged at least at positions corresponding to said pixel portions, provided on said first substrate or on said second substrate, in which a display is performed by selectively applying a voltage between said signal electrodes and said opposed data electrodes to thereby change optical characteristics of said liquid crystal layer between said signal electrode and said opposed data electrodes at said pixel portion, wherein a full color display of applying selection signals to said plurality of signal electrodes constituting all said pixel portions of said color liquid crystal display panel in a time sharing manner, and applying data signals to said data electrodes in correspondence to the selection signals applied to said signal electrodes, and, further, at least one of the selection signal and data signal serving as a gradation signal for changing optical characteristics of said liquid crystal layer at many levels to allow said filters of three primary colors to be individually selected including gradations required for said full color display; and a reduced color display of reducing the number of levels of the gradation signal to be less than that of said full color display to allow said filters of three primary colors to be individually selected with the reduced gradation; are selectively performed.

11. The method of driving a color liquid crystal display panel according to claim 10, wherein a color reducing display of applying selection signals in such a manner to simultaneously select a plurality of said signal electrodes to simultaneously select said filters of a plurality of the colors arranged at positions corresponding to said plurality of signal electrodes, is also allowed to be selected.

12. The method of driving a color liquid crystal display panel according to claim 11, wherein a limited color display of applying selection signals to part of said plurality of signal electrodes in a time sharing manner, and not applying selection signals to other signal electrodes to allow only said color filters arranged at positions corresponding to said signal electrodes to which the selection signals are applied to be selected, is also allowed to be selected.

13. The method of driving a color liquid crystal display panel according to claim 10, wherein a limited color display of applying selection signals to part of said plurality of signal electrodes in a time sharing manner, and not applying selection signals to other signal electrodes to allow only said color filters arranged at positions corresponding to said signal electrodes to which the selection signals are applied to be selected, is also allowed to be selected.

14. The method of driving a color liquid crystal display panel according to claim 10, wherein said full color display and other display are switched according to time.

15. The method of driving a color liquid crystal display panel according to claim 10, wherein said full color display and other display are individually performed with a display region constituted by said all pixel portions of said color liquid crystal display panel divided into a plurality of display regions.

16. The method of driving a color liquid crystal display panel according to claim 10, wherein said full color display and other display are switched according to a remaining capacity of a battery so that said full color display is performed when the remaining capacity of the battery is larger than a predetermined capacity, and said other display is performed when the remaining capacity is below the predetermined capacity, respectively.

17. A method of controlling a display of a timepiece including a liquid crystal display panel for displaying a time or information related to a time, wherein said liquid crystal display panel is a color liquid crystal display panel including: a transparent first substrate formed with a plurality of signal electrodes and a transparent second substrate formed with a plurality of data electrodes arranged so that a face formed with said signal electrodes and a face formed with said data electrodes are opposed to each other; a liquid crystal layer sealed in a gap therebetween; pixel portions respectively constituted at portions where said signal electrodes cross over and planarly overlap said data electrodes; and color filters, in which filters of three primary colors are alternately arranged at least at positions corresponding to said pixel portions, provided on said first substrate or on said second substrate, and displaying said time or information related to a time by selectively applying a voltage between said signal electrodes and said opposed data electrodes to thereby change optical characteristics of said liquid crystal layer between said signal electrodes and said opposed data electrodes at said pixel portion, and a normal color display of applying selection signals to said plurality of signal electrodes constituting all said pixel portions of said color liquid crystal display panel in a time sharing manner, and applying data signals to said data electrodes in correspondence to the selection signals applied to said signal electrodes to allow said color filters of said pixel portions to be individually selected; and a color reducing display of applying selection signals in such a manner to simultaneously select a plurality of said signal electrodes to simultaneously select said filters of a plurality of the colors arranged at positions corresponding to said plurality of signal electrodes; are selectively performed.

18. The method of controlling a display of a timepiece according to claim 17, wherein said color liquid crystal display panel is a color liquid crystal display panel including color filters, in which filters of three primary colors in the form of stripes are alternately arranged to be parallel to and planarly overlap said signal electrodes, provided on said first substrate or on said second substrate, and selection signals are applied to simultaneously select a plurality of said signal electrodes in said color reducing display to simultaneously select said filters of a plurality of the colors in the form of stripes arranged to planarly overlap said plurality of signal electrodes respectively.

19. The method of controlling a display of a timepiece according to claim 17, wherein said normal color display and other display are switched according to time.

20. The method of controlling a display of a timepiece according to claim 17, wherein said normal color display and other display are individually performed with a display region constituted by said all pixel portions of said color liquid crystal display panel divided into a plurality of display regions.

21. The method of controlling a display of a timepiece according to claim 17, wherein said normal color display and other display are switched according to a remaining capacity of a battery embedded in said timepiece so that said normal color display is performed when the remaining capacity of the battery is larger than a predetermined capacity, and said other display is performed when the remaining capacity is below the predetermined capacity respectively.

22. The method of controlling a display of a timepiece according to claim 17, wherein said normal color display and other display are switched according to a quantity of power generation by a power generator such as a solar cell or the like embedded in said timepiece so that said normal color display is performed when the quantity of power generation is larger than a predetermined quantity, and said other display is performed when the quantity of power generation is below the predetermined quantity respectively.

23. A method of controlling a display of a timepiece including a liquid crystal display panel for displaying a time or information related to a time, wherein said liquid crystal display panel is a color liquid crystal display panel including: a transparent first substrate formed with a plurality of signal electrodes and a transparent second substrate formed with a plurality of data electrodes arranged so that a face formed with said signal electrodes and a face formed with said data electrodes are opposed to each other; a liquid crystal layer sealed in a gap therebetween; pixel portions respectively constituted at portions where said signal electrodes cross over and planarly overlap said data electrodes; and color filters, in which filters of three primary colors are alternately arranged at least at positions corresponding to said pixel portions, provided on said first substrate or on said second substrate, and displaying said time or information related to a time by selectively applying a voltage between said signal electrodes and said opposed data electrodes to thereby change optical characteristics of said liquid crystal layer between said signal electrodes and said opposed data electrodes at said pixel portion, and a normal color display of applying selection signals to said plurality of signal electrodes constituting all said pixel portions of said color liquid crystal display panel in a time sharing manner, and applying data signals to said data electrodes in correspondence to the selection signals applied to said signal electrodes to allow said color filters of said pixel portions to be individually selected; and a limited color display of applying selection signals to part of said plurality of signal electrodes in a time sharing manner, and not applying selection signals to other signal electrodes to allow only said color filters arranged at positions corresponding to said signal electrodes to which the selection signals are applied to be selected; are selectively performed.

24. The method of controlling a display of a timepiece according to claim 23, wherein said color liquid crystal display panel is a color liquid crystal display panel including color filters, in which filters of three primary colors in the form of stripes are alternately arranged to be parallel to and planarly overlap said signal electrodes, provided on said first substrate or on said second substrate, and selection signals are applied to part of said plurality of signal electrodes in a time sharing manner, and no selection signal is applied to other signal electrodes in said limited color display to allow only said filters, out of said color filters, in the form of stripes arranged to planarly overlap said signal electrodes respectively to which the selection signals are applied to be selected.

25. A method of controlling a display of a timepiece including a liquid crystal display panel for displaying a time or information related to a time, wherein said liquid crystal display panel is a color liquid crystal display panel including: a transparent first substrate formed with a plurality of signal electrodes and a transparent second substrate formed with a plurality of data electrodes arranged so that a face formed with said signal electrodes and a face formed with said data electrodes are opposed to each other; a liquid crystal layer sealed in a gap therebetween; pixel portions respectively constituted at portions where said signal electrodes cross over and planarly overlap said data electrodes; and color filters, in which filters of three primary colors in the form of stripes are alternately arranged to be parallel to and planarly overlap said data electrodes, provided on said first substrate or on said second substrate, and displaying said time or information related to a time by selectively applying a voltage between said signal electrodes and said opposed data electrodes to thereby change optical characteristics of said liquid crystal layer between said signal electrodes and said opposed data electrodes at said pixel portion, and a normal color display of applying selection signals to said plurality of signal electrodes constituting all said pixel portions of said color liquid crystal display panel in a time sharing manner, and applying data signals to said data electrodes in correspondence to the selection signals applied to said signal electrodes to allow said individual color filters of said pixel portions to be selected; and a color display of applying selection signals in such a manner to simultaneously select a plurality of said signal electrodes, and applying data signals to said plurality of data electrodes in a time sharing manner to allow said filters of a plurality of the colors in the form of stripes arranged to planarly overlap said plurality of data electrodes respectively to be individually selected and to reduce power consumption; are selectively performed.

26. A method of controlling a display of a timepiece including a liquid crystal display panel for displaying a time or information related to a time, wherein said liquid crystal display panel is a color liquid crystal display panel including: a transparent first substrate formed with a plurality of signal electrodes and a transparent second substrate formed with a plurality of data electrodes arranged so that a face formed with said signal electrodes and a face formed with said data electrodes are opposed to each other; a liquid crystal layer sealed in a gap therebetween; pixel portions respectively constituted at portions where said signal electrodes cross over and planarly overlap said data electrodes; and color filters, in which filters of three primary colors in the form of stripes are alternately arranged to be parallel to and planarly overlap said data electrodes, provided on said first substrate or on said second substrate, and displaying said time or information related to a time by selectively applying a voltage between said signal electrodes and said opposed data electrodes to thereby change optical characteristics of said liquid crystal layer between said signal electrodes and said opposed data electrodes at said pixel portion, and a normal color display of applying selection signals to said plurality of signal electrodes constituting all said pixel portions of said color liquid crystal display panel in a time sharing manner, and applying data signals to said data electrodes in correspondence to the selection signals applied to said signal electrodes to allow said filters of three primary colors in the form of stripes to be individually selected; and a black-and-white display of applying selection signals in such a manner to simultaneously select a plurality of said signal electrodes, and simultaneously applying the same data signals to three of said data electrodes on which said filters of three primary colors in the form of stripes are arranged to simultaneously select said filters of three primary colors to reduce power consumption; are selectively performed.

27. A method of controlling a display of a timepiece including a liquid crystal display panel for displaying a time or information related to a time, wherein said liquid crystal display panel is a color liquid crystal display panel including: a transparent first substrate formed with a plurality of signal electrodes and a transparent second substrate formed with a plurality of data electrodes arranged so that a face formed with said signal electrodes and a face formed with said data electrodes are opposed to each other; a liquid crystal layer sealed in a gap therebetween; pixel portions respectively constituted at portions where said signal electrodes cross over and planarly overlap said data electrodes; and color filters, in which filters of three primary colors are alternately arranged at least at positions corresponding to said pixel portions, provided on said first substrate or on said second substrate, and displaying said time or information related to a time by selectively applying a voltage between said signal electrodes and said opposed data electrodes to thereby change optical characteristics of said liquid crystal layer between said signal electrodes and said opposed data electrodes at said pixel portion, and a full color display of applying selection signals to said plurality of signal electrodes constituting all said pixel portions of said color liquid crystal display panel in a time sharing manner, and applying data signals to said data electrodes in correspondence to the selection signals applied to said signal electrodes, and, further, at least one of the selection signal and data signal serving as a gradation signal for changing optical characteristics of said liquid crystal layer at many levels to allow said filters of three primary colors to be individually selected including gradations required for said full color display; and a reduced color display of reducing the number of levels of the gradation signal to be less than that of said full color display to allow said filters of three primary colors to be individually selected in with the reduced gradation; are selectively performed.

28. The method of controlling a display of a timepiece according to claim 27, wherein a color reducing display of applying selection signals in such a manner to simultaneously select a plurality of said signal electrodes to simultaneously select said filters of a plurality of the colors arranged at positions corresponding to said plurality of signal electrodes, is also allowed to be selected.

29. The method of controlling a display of a timepiece according to claim 28, wherein a limited color display of applying selection signals to part of said plurality of signal electrodes in a time sharing manner, and not applying selection signals to other signal electrodes to allow only said color filters arranged at positions corresponding to said signal electrodes to which the selection signals are applied to be selected, is also allowed to be selected.

30. The method of controlling a display of a timepiece according to claim 27, wherein a limited color display of applying selection signals to part of said plurality of signal electrodes in a time sharing manner, and not applying selection signals to other signal electrodes to allow only said color filters arranged at positions corresponding to said signal electrodes to which the selection signals are applied to be selected, is also allowed to be selected.

31. The method of controlling a display of a timepiece according to claim 27, wherein said full color display and other display are switched according to time.

32. The method of controlling a display of a timepiece according to claim 27, wherein said full color display and other display are individually performed with a display region constituted by said all pixel portions of said color liquid crystal display panel divided into a plurality of display regions.

33. The method of controlling a display of a timepiece according to claim 27, wherein said full color display and other display are switched according to a remaining capacity of a battery embedded in said timepiece so that said full color display is performed when the remaining capacity of the battery is larger than a predetermined capacity, and said other display is performed when the remaining capacity is below the predetermined capacity respectively.

34. The method of controlling a display of a timepiece according to claim 27, wherein said full color display and other display are switched according to a quantity of power generation by a power generator such as a solar cell or the like embedded in said timepiece so that said full color display is performed when the quantity of power generation is larger than a predetermined quantity, and said other display is performed when the quantity of power generation is below the predetermined quantity respectively.

* * * * *

UNITED STATES PATENT AND TRADEMARK OFFICE
CERTIFICATE OF CORRECTION

PATENT NO. : 6,429,840 B1
DATED : August 6, 2002
INVENTOR(S) : Sekiguchi, Kanetaka It is certified that error appears in the above-identified patent and that said Letters Patent is hereby corrected as shown below:

Title page,
Item [87], change Item "[87] PCT Pub. Date: May 4, 2001" to be -- [87] PCT Pub. Date: April 5, 2001 --

Column 32,
Line 1, change, "signal electrode" to be -- signal electrodes --
Lines 1 and 66, change, "opposed electrode" to be -- opposed data electrodes --
Line 64, change, opposed electrodes" to be -- opposed data electrodes --

Column 33,
Line 44, change, "signal electrode" to be -- signal electrodes --

Column 34,
Lines 13 and 49, change, "signal electrode" to be -- signal electrodes --
Line 13, change, "opposed electrode" to be -- opposed data electrodes --

Signed and Sealed this

Fourth Day of March, 2003

JAMES E. ROGAN
*Director of the United States Patent and Trademark Office*